US011034300B2

(12) United States Patent
Kaneko

(10) Patent No.: US 11,034,300 B2
(45) Date of Patent: Jun. 15, 2021

(54) DOOR MIRROR

(71) Applicant: Mitsuba Corporation, Gunma (JP)

(72) Inventor: Yoshitaka Kaneko, Kiryu (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 16/612,914

(22) PCT Filed: Apr. 27, 2018

(86) PCT No.: PCT/JP2018/017196
§ 371 (c)(1),
(2) Date: Nov. 12, 2019

(87) PCT Pub. No.: WO2018/216434
PCT Pub. Date: Nov. 29, 2018

(65) Prior Publication Data
US 2020/0164804 A1   May 28, 2020

(30) Foreign Application Priority Data

May 23, 2017 (JP) .............................. JP2017-101684
Sep. 13, 2017 (JP) .............................. JP2017-175908

(51) Int. Cl.
*B60R 1/06* (2006.01)
*G02B 1/14* (2015.01)
(Continued)

(52) U.S. Cl.
CPC .............. *B60R 1/0602* (2013.01); *B60R 1/12* (2013.01); *G02B 1/14* (2015.01); *G02B 1/18* (2015.01);
(Continued)

(58) Field of Classification Search
None
See application file for complete search history.

(56) References Cited

U.S. PATENT DOCUMENTS

2002/0003571 A1\* 1/2002 Schofield ............ B60R 11/0235
348/148
2004/0120055 A1   6/2004 Suzuki et al.
(Continued)

FOREIGN PATENT DOCUMENTS

JP   H05032191U U   4/1993
JP   05294183 A   11/1993
(Continued)

OTHER PUBLICATIONS

PCT Office, International Search Report issued in corresponding PCT/JP2018/017196 dated May 29, 2018, 9 pages.
(Continued)

*Primary Examiner* — Christopher G Findley
(74) *Attorney, Agent, or Firm* — Wood Herron & Evans LLP

(57) ABSTRACT

A door mirror includes a mirror housing that is provided in a side portion of a vehicle body, a camera unit that is accommodated inside the mirror housing and captures an image of a side behind the vehicle body, a cut filter that reduces a quantity of light incident on the camera unit, and a heater that is provided on a rear surface of the cut filter on the camera unit side and is capable of heating the cut filter. The camera unit is disposed such that a central axis intersects a surface direction of the cut filter. The camera unit and the heater are disposed adjacent to each other.

14 Claims, 17 Drawing Sheets

(51) Int. Cl.
*G02B 1/18* (2015.01)
*B60R 1/12* (2006.01)
*H04N 5/225* (2006.01)
*H04N 5/247* (2006.01)

(52) U.S. Cl.
CPC ........... *H04N 5/2252* (2013.01); *H04N 5/247* (2013.01); *B60R 2001/1253* (2013.01); *B60R 2300/105* (2013.01); *B60R 2300/8046* (2013.01)

(56) References Cited

U.S. PATENT DOCUMENTS

2006/0171704 A1* 8/2006 Bingle ................. H04N 5/2254
                                                    396/419
2015/0097955 A1   4/2015 De Wind et al.
2016/0173748 A1*  6/2016 Oba ....................... G03B 17/02
                                                    348/148

FOREIGN PATENT DOCUMENTS

| JP | 06000935 A | 1/1994 |
|----|------------|--------|
| JP | H06037802U U | 5/1994 |
| JP | H11327016 A | 11/1999 |
| JP | 2002096685 A | 4/2002 |
| JP | 2003327048 A | 11/2003 |
| JP | 2005145428 A | 6/2005 |
| JP | 2006525897 A | 11/2006 |
| JP | 2007112368 A | 5/2007 |
| JP | 2007208865 A | 8/2007 |
| JP | 2009040144 A | 2/2009 |
| JP | 2016222181 A | 12/2016 |
| JP | 2017054056 A | 3/2017 |
| JP | 2017065385 A | 4/2017 |
| JP | 2017116599 A | 6/2017 |
| KR | 20140039831 A | 4/2014 |
| WO | 2014027587 A1 | 2/2014 |

OTHER PUBLICATIONS

Japanese Patent Office, Office Action issued in JP 2017-175908 dated Aug. 18, 2020.
European Patent Office, Search Report issued in EP 18806844.9 dated Sep. 18, 2020.
Japanese Patent Office, Office Action issued in JP 2017-101684 dated Feb. 24, 2021.

* cited by examiner

DOOR MIRROR

TECHNICAL FIELD

The present invention relates to a door mirror.

Priority is claimed on Japanese Patent Application No. 2017-101684, filed on May 23, 2017 and Japanese Patent Application No. 2017-175908, filed on Sep. 13, 2017, the contents of which are incorporated herein by reference.

BACKGROUND

A door mirror is provided in a side portion of a vehicle body of a vehicle, so that a driver can visually recognize a side behind the side portion of the vehicle body from a driver's seat. Incidentally, in recent years, a technology in which a camera is provided in place of a door mirror and a monitor displaying a video image captured by this camera is provided inside a vehicle cabin has been proposed.

According to the technology, the camera is accommodated inside a mirror housing in which an opening portion is formed toward a rear side in a traveling direction of the vehicle body. A half mirror is provided in the opening portion such that this opening portion is blocked. In such a constitution, similar to a door mirror, a driver can check the side behind the side portion of the vehicle body through the monitor. Moreover, air resistance of the vehicle body can be reduced, and contact with the door mirror in a parking lot, a narrow alley, or the like can be avoided by removing the door mirror protruding from the vehicle body.

Incidentally, when water droplets adhere to the half mirror or when the half mirror fogs, a field of view is reduced so that an image-capturing part of the camera is reduced. Therefore, a technology in which a heater is provided inside a mirror housing has been proposed (for example, refer to Patent Document 1).

According to the technology, water droplets which have adhered to a half mirror can be vaporized and fogging can be eliminated by heating the inside of the mirror housing. In addition, a lens of a camera can also be prevented from fogging.

In addition, a door mirror is provided in a side portion of a vehicle body of a vehicle, so that a driver can visually recognize a side behind the side portion of the vehicle body from a driver's seat. Incidentally, in recent years, a technology in which a camera is provided in place of a door mirror and a monitor displaying a video image captured by this camera is provided inside a vehicle cabin has been proposed.

For example, there is a door mirror in which one camera is provided inside a housing main body (outer cover) provided in a side portion of a vehicle body. The camera is disposed such that a lens is directed rearward in the traveling direction (for example, refer to Patent Document 2).

In such a constitution, similar to a door mirror, a driver can check a side behind the side portion of the vehicle body through a monitor. Moreover, the housing main body can be set to have a size to an extent that the camera can be accommodated. In this manner, air resistance of the vehicle body can be reduced and contact with the door mirror in a parking lot, a narrow alley, or the like can be avoided by removing the door mirror protruding from the vehicle body.

RELATED ART DOCUMENTS

Patent Documents

[Patent Document 1] Japanese Unexamined Utility Model Application, First Publication No. H6-935

[Patent Document 2] Japanese Unexamined Patent Application, First Publication No. 2017-116599

SUMMARY OF INVENTION

Problems to be Solved by the Invention

However, since there is a need to heat the inside of a mirror housing in its entirety, there is a possibility that a large-capacity heater will be necessary.

In addition, if a highly sensitive camera is used in order to enhance nighttime visibility, there is a possibility that image capturing at the time of backlighting or the like will become unclear, such as fogging in white.

In addition, since only one camera is provided, it is difficult to perform adjustment of an angle of view expanding and reducing an image-capturing range. Moreover, control has to be performed with one camera for both capturing an image and detecting an obstacle or detecting a mark or the like on a camera lens, so that there is a concern that control may be complicated. In addition, if a highly sensitive camera is used in order to enhance nighttime visibility, there is a possibility that image capturing at the time of backlighting or the like will become unclear, such as fogging in white.

Therefore, the present invention provides a door mirror in which a field of view of a mirror can be prevented from being reduced and a lens of a camera can be prevented from fogging, while the capacity of a heater is decreased.

In addition, a door mirror is provided in which unclear image capturing at the time of backlighting or the like can be curbed even when a camera is highly sensitive.

Moreover, a door mirror is provided in which adjustment of an angle of view and detection of a sharpness of a captured image can be performed easily.

In addition, a door mirror is provided in which unclear image capturing at the time of backlighting or the like can be curbed even when a camera is highly sensitive.

Means for Solving the Problem

According to a first aspect of the present invention, a door mirror is provided, including a mirror housing that is provided in a side portion of a vehicle body, a camera unit that is accommodated inside the mirror housing and captures an image of a rear side in a traveling direction of the vehicle body, a cut filter that reduces a quantity of light incident on the camera unit, and a heater that is provided on a surface of the cut filter on the camera unit side and is capable of heating the cut filter. The camera unit is disposed such that a central axis intersects a surface direction of the cut filter. The camera unit and the heater are disposed adjacent to each other.

In such a constitution, only necessary places in the cut filter and the camera unit can be heated without heating the inside of the mirror housing in its entirety. Therefore, a field of view of the cut filter can be prevented from being reduced, and a lens of the camera unit can be prevented from fogging.

In addition, the quantity of light incident on the camera unit can be reduced by the cut filter. Therefore, unclear image capturing at the time of backlighting or the like can be curbed even when the camera unit is highly sensitive.

According to a second aspect of the present invention, in the door mirror according to the first aspect of the present invention, a distance L between the camera unit and the heater is set to satisfy 1 mm≤L≤10 mm.

In such a constitution, the camera unit can be heated efficiently by the heater. In addition, water droplets can be prevented from remaining in a gap between the heater (cut filter) and the camera unit due to an excessively narrow gap between the heater and the camera unit, for example, caused by the surface tension of the water droplets which have adhered thereto. Therefore, the field of view of the camera unit can be reliably prevented from becoming poor.

According to a third aspect of the present invention, in the door mirror according to the second aspect of the present invention, the distance L is set to satisfy 2 mm≤L≤5 mm.

In this manner, the camera unit can be heated more efficiently by the heater by appropriately managing the distance between the heater and the camera unit within a narrow range. In addition, water droplets which have adhered in the gap between the heater and the camera unit can be reliably prevented from remaining therein.

According to a fourth aspect of the present invention, in the door mirror according to the first aspect of the present invention, the cut filter is constituted of at least one of a half mirror, an electrochromic filter, a polarizing plate, an ND filter, and a low reflection treatment glass.

In such a constitution, the quantity of light incident on the camera unit can be reduced reliably by the cut filter. In addition, an image of the side behind the side portion of the vehicle body can be captured reliably by the camera unit via the cut filter.

According to a fifth aspect of the present invention, in the door mirror according to any one of the first to fourth aspects of the present invention, a surface of the cut filter on the rear side in the traveling direction of the vehicle body is subjected to a hydrophilic treatment.

In such a constitution, for example, even when water droplets adhere to the cut filter, it is possible to prevent a state where the water droplets spread quickly and the water droplets having adhered to the cut filter remain. Therefore, the field of view of the cut filter can be prevented from being reduced.

According to a sixth aspect of the present invention, in the door mirror according to any one of the first to fourth aspects of the present invention, a surface of the cut filter on the rear side in the traveling direction of the vehicle body is subjected to a water repellent treatment.

In such a constitution, for example, even when water droplets adhere to the cut filter, the water droplets are repelled, and it is possible to prevent a state where the water droplets having adhered to the cut filter remain. Therefore, the field of view of the cut filter can be prevented from being reduced.

According to a seventh aspect of the present invention, in the door mirror according to any one of the first to sixth aspects of the present invention, an opening portion is formed in the mirror housing toward the rear side in the traveling direction of the vehicle body. The mirror housing includes a frame body which is fitted into a circumferential edge of the opening portion of the mirror housing and into which the cut filter is fitted. The opening portion is blocked by the cut filter and the frame body.

In such a constitution, the cut filter can be fixed reliably to the mirror housing. In addition, entry of water droplets, dust, or the like into the mirror housing can be curbed.

According to an eighth aspect of the present invention, in the door mirror according to the seventh aspect of the present invention, a groove portion is formed between the mirror housing and the frame body and over an entire circumference of the frame body.

Here, water droplets which have adhered to a surface of the mirror housing move from the front side in the traveling direction to the rear side in the traveling direction due to traveling air generated when a vehicle travels. At this time, movement of the water droplets from the front side in the traveling direction to the rear side in the traveling direction is hindered due to the groove portion. Then, the water droplets move downward along the groove portion. Therefore, water droplets which have adhered to the surface of the mirror housing can be prevented from infiltrating into the cut filter via the frame body. Thus, the field of view of the cut filter can be more reliably prevented from being reduced.

According to a ninth aspect of the present invention, in the door mirror according to any one of the first to eighth aspects of the present invention, the camera unit has at least two cameras, which are a first camera which captures an image of the rear side in the traveling direction including a part of the vehicle body, and a second camera which captures an image of a range including a side further outward in a vehicle width direction of the vehicle body than an image-capturing range of the first camera.

In this manner, since two or more cameras are provided, the image-capturing range can be changed easily by switching the camera to be used. In addition, complicated control can be curbed by using a camera for capturing an image and a camera for detecting an obstacle or detecting a mark in accordance with a purpose.

Moreover, the quantity of light incident on the camera unit can be reduced by the cut filter. Therefore, unclear image capturing at the time of backlighting or the like can be curbed even when the camera unit is highly sensitive.

According to a tenth aspect of the present invention, in the door mirror according to the ninth aspect of the present invention, the mirror housing includes a support portion which is provided in the side portion of the vehicle body, and a housing main body which is formed integrally with a tip of the support portion on a side opposite to the vehicle body.

In such a constitution, the number of components of the door mirror can be reduced, and the manufacturing cost of the door mirror can be decreased.

In addition, the door mirror can have a neat appearance, and the designability of the door mirror can be enhanced.

According to an eleventh aspect of the present invention, in the door mirror according to the ninth or tenth aspect of the present invention, the second camera performs image capturing to detect a material adhering to at least any one of a lens of the second camera and the cut filter.

In this manner, since the first camera is used for capturing an image as a camera for visually recognizing the side behind the vehicle body and the second camera is used as a sensor for detecting a mark on the lens or the cut filter, control can be performed easily compared to a case where one camera serves as both a camera for visually recognizing and a sensor as in the related art.

In addition, an image of the side behind the vehicle body can be captured reliably and clearly by the first camera by wiping away an adhesive material or the like on the lens or the cut filter based on detection results of the second camera.

According to a twelfth aspect of the present invention, in the door mirror according to any one of the ninth to eleventh aspects of the present invention, the second camera is provided on the vehicle body side. The first camera is provided on a side further outward in the vehicle width direction of the vehicle body than the second camera.

In this manner, since the second camera capturing an image of the side outward in the vehicle width direction is disposed on the vehicle body side (side inward in the vehicle width direction), projection of a frame of the housing main body in the image-capturing range of the second camera can be curbed as much as possible. As a result, the second camera can capture an image with as large a range as possible to the side outward in the vehicle width direction.

In addition, when the second camera is used as a sensor, if this second camera can capture an image with as large a range as possible to the side outward in the vehicle width direction, the accuracy of detecting an obstacle or the like can be enhanced.

According to a thirteenth aspect of the present invention, in the door mirror according to any one of the ninth to twelfth aspects of the present invention, the first camera and the second camera are disposed to partially overlap each other when viewed in a height direction of the vehicle body.

In such a constitution, the length of the housing main body in the vehicle width direction can be set to be short, so that an increase in vehicle width of the vehicle body can be curbed.

Incidentally, when a harness to be connected to the camera unit, a storing device of the door mirror, and the like are accommodated inside the support portion, there is a need to expand the support portion in the height direction of the vehicle body. However, since the first camera and the second camera are disposed to partially overlap each other when viewed in the height direction of the vehicle body, the housing main body can be formed to be large in the height direction, and the door mirror in its entirety can be designed to have a smooth shape without unevenness. Therefore, the designability of the door mirror can be enhanced.

According to a fourteenth aspect of the present invention, in the door mirror according to any one of the ninth to thirteenth aspects of the present invention, one surface of the cut filter is worked to have a mirror shape, and the one surface is disposed toward the rear side in the traveling direction of the vehicle body.

In such a constitution, even if a problem occurs in the camera unit, since the cut filter is used as a door mirror, the side behind the vehicle body can be visually recognized, so that a fail-safe function of the door mirror can be enhanced.

Furthermore, for example, if the second camera used as a sensor is disposed on the vehicle body side, even when the housing main body tilts to the vehicle body side, an image with as large a range as possible to the side outward in the vehicle width direction can be captured by the second camera. Therefore, the function of the second camera as a sensor is not impaired. As a result, a tilt adjustment range of the housing main body can be expanded as much as possible. Thus, the cut filter can be utilized reliably as a mirror for checking the side behind the vehicle body.

According to a fifteenth aspect of the present invention, in the door mirror according to any one of the ninth to fourteenth aspects of the present invention, a protector is provided between the cut filter and the camera unit. The protector has a plate-shaped main body portion, and a tubular light-shielding portion which projects from the main body portion and covers a surrounding area of each of the lenses of the first camera and the second camera.

In such a constitution, an excessive quantity of light incident on the camera can be more reliably prevented by the light-shielding portion, so that a clearer captured image can be obtained. In addition, since the inside of the housing main body can be made unlikely to be seen from the outside due to the main body portion, the designability of the door mirror can be improved.

Advantage of the Invention

According to the door mirror described above, only necessary places in the cut filter and the camera unit can be heated without heating the inside of the mirror housing in its entirety. Therefore, the field of view of the cut filter can be prevented from being reduced, and the lens of the camera unit can be prevented from fogging.

In addition, the quantity of light incident on the camera unit can be reduced by the cut filter. Therefore, unclear image capturing at the time of backlighting or the like can be curbed even when the camera unit is highly sensitive.

In addition, according to the door mirror described above, since two or more cameras are provided, the image-capturing range can be changed easily by switching the camera to be used. In addition, complicated control can be curbed by using a camera for capturing an image and a camera for detecting an obstacle or detecting a mark in accordance with a purpose.

Moreover, the quantity of light incident on the camera unit can be reduced by the cut filter. Therefore, unclear image capturing at the time of backlighting or the like can be curbed even when the camera unit is highly sensitive.

BRIEF DESCRIPTION OF THE DRAWINGS

FIG. 9 is a flowchart of the door mirror system according to the first embodiment of the present invention at the time of rainy weather or the like.

FIG. 14 is a flowchart of the door mirror system according to the second embodiment of the present invention at the time of rainy weather or the like.

DESCRIPTION OF THE EMBODIMENTS

Next, embodiments of the present invention will be described based on the drawings.

First Embodiment (Door Mirror)

Figure 1:
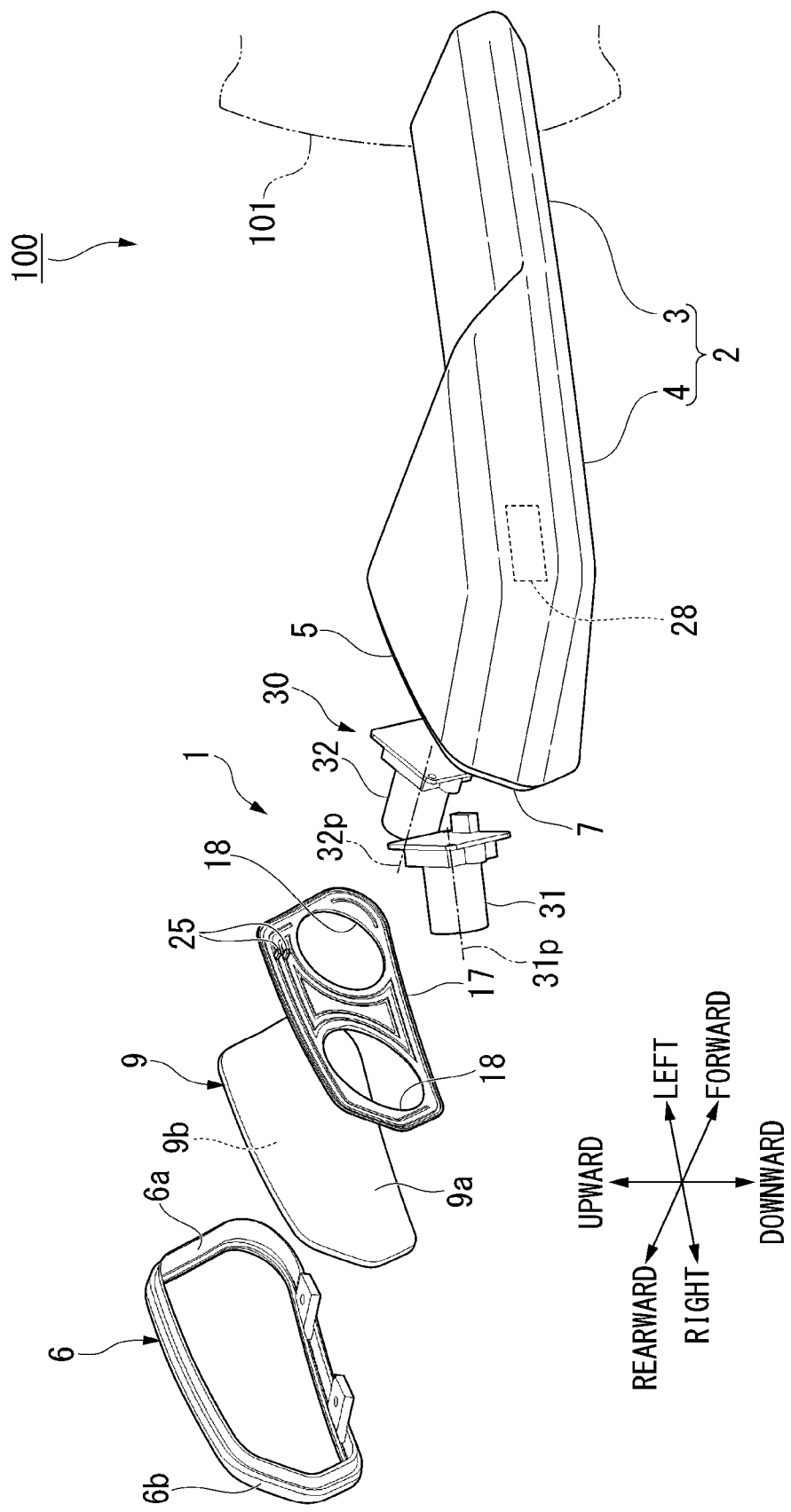
FIG. 1 is an exploded perspective view of a door mirror according to a first embodiment of the present invention viewed from a front side in a traveling direction.
Figure 2:
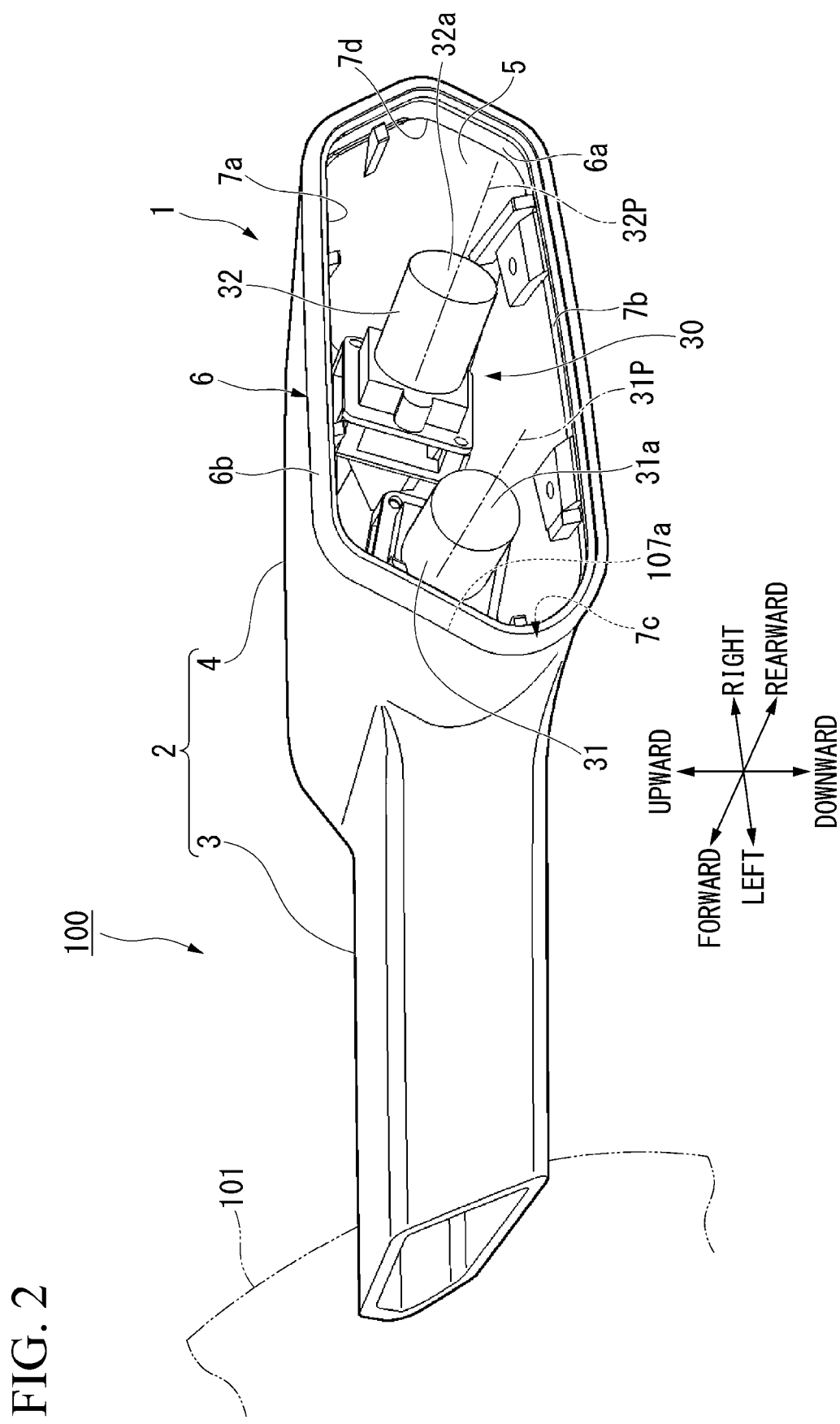
FIG. 2 is a perspective view of the door mirror according to the first embodiment of the present invention viewed from a rear side in the traveling direction in a state where a cut filter is detached.

FIG. 1 is an exploded perspective view of a door mirror 1 viewed from a front side in a traveling direction of a vehicle 100. FIG. 2 is a perspective view of the door mirror 1 viewed from a rear side in the traveling direction of the vehicle 100 in a state where a cut filter 9 constituting the door mirror 1 is detached.

In FIGS. 1 and 2, the door mirror 1 indicates a door mirror which is provided on a driver's seat side, that is, in a right side portion of a vehicle body 101 in the traveling direction. In addition, in description of the following embodiments, forward and rearward in the traveling direction will be simply referred to as a front-rear direction, a right side in a vehicle width direction while heading in the traveling direction will be simply referred to as a right side, a left side will be simply referred to as a left side, and an up-down direction of a gravity direction will be simply referred to as an up-down direction.

As illustrated in FIGS. 1 and 2, the door mirror 1 includes a mirror housing 2 which is provided in the right side portion of the vehicle body 101, a rim portion 6 which is fitted into the mirror housing 2, the cut filter 9 which is fitted into the rim portion 6, a heater 17 which is attached to the cut filter 9, and a camera unit 30 which is accommodated inside the mirror housing 2.

The door mirrors 1 are provided in the right side portion and a left side portion of the vehicle body 101. Two door mirrors 1 are constituted in a line-symmetrical manner about the middle in the vehicle width direction and have the same basic constitution. Therefore, in the following description, only the door mirror 1 on the driver's seat side will be described, and description of the door mirror 1 on a passenger seat side will be omitted.

(Mirror Housing)

The mirror housing 2 is formed of a resin or the like. The mirror housing 2 is constituted of a support portion 3 which protrudes toward the right side from the vehicle body 101, and a housing main body 4 which is formed integrally with a tip of the support portion 3. The support portion 3 is formed to have a substantially quadrangular tube shape. The housing main body 4 is formed to have a substantially bathtub shape having an opening portion 5 toward the rear side.

A fitting portion 7 constituting a circumferential edge of this opening portion 5 is formed to protrude rearward at a tip of the opening portion 5. The fitting portion 7 is formed to have a wall thickness slightly thinner than the wall thickness of the housing main body 4 such that an inner side surface is flush with an inner surface of the housing main body 4, and a step is formed on an outer side surface from an outer surface of the housing main body 4. This fitting portion 7 is a place into which the rim portion 6 (which will be described below) is fitted and is formed throughout the entire circumference of the opening portion 5 and along the shape of the opening portion 5.

That is, the fitting portion 7 is constituted of an upper side 7a and a lower side 7b facing each other in the up-down direction and extending in a left-right direction, an inner side 7c straddling ends of the upper side 7a and the lower side 7b on the vehicle body 101 side (left side), and an outer side 7d straddling ends of the upper side 7a and the lower side 7b on a side (right side) opposite to the vehicle body 101, which are formed in a connected manner.

The inner side 7c is constituted of an inclination portion 107a formed such that the greater part of the middle in the up-down direction extends obliquely upward from below to be separated gradually from the vehicle body 101, a first arc portion 107b connecting an upper end of the inclination portion 107a and the upper side 7a to each other, and a second arc portion 107c connecting a lower end of the inclination portion 107a and the lower side 7b to each other, which are formed in a connected manner. The radius of curvature of the second arc portion 107c is set to be greater than the radius of curvature of the first arc portion 107b.

The outer side 7d is formed in a curved manner such that substantially the middle in the up-down direction protrudes to the far right side.

(Rim Portion)

The rim portion (frame body) 6 is fitted into the fitting portion 7 formed in this manner. The rim portion 6 is formed to have a frame shape corresponding to the shape of the fitting portion 7. In addition, the rim portion 6 is formed to have a substantially V-shaped cross section such that it is folded back from the inner side surface of the opening portion 5 of the fitting portion 7 to the outer side surface via a tip of the fitting portion 7. That is, in the rim portion 6, an inner wall 6a which is fitted into the inner surface of the fitting portion 7, and an outer wall 6b which is folded back from a rear end of the inner wall 6a and is fitted into an outer surface of the fitting portion 7 are formed in a connected manner.

Figure 3:
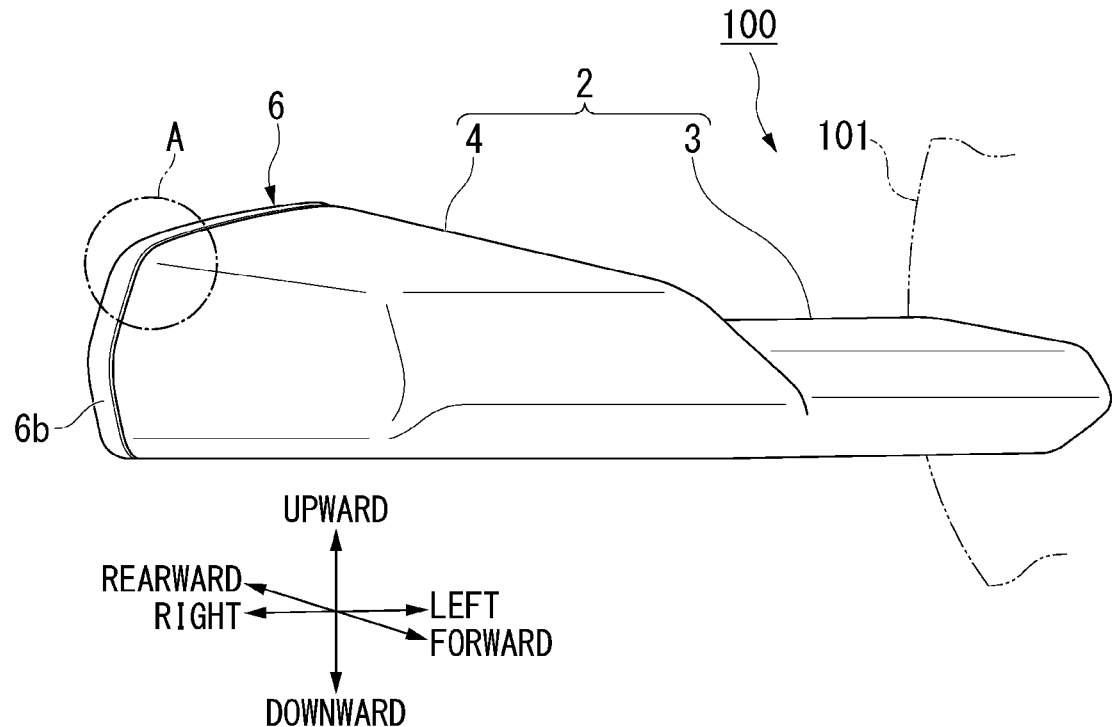
FIG. 3 is a perspective view of the door mirror according to the first embodiment of the present invention viewed from the front side in the traveling direction.
Figure 4:
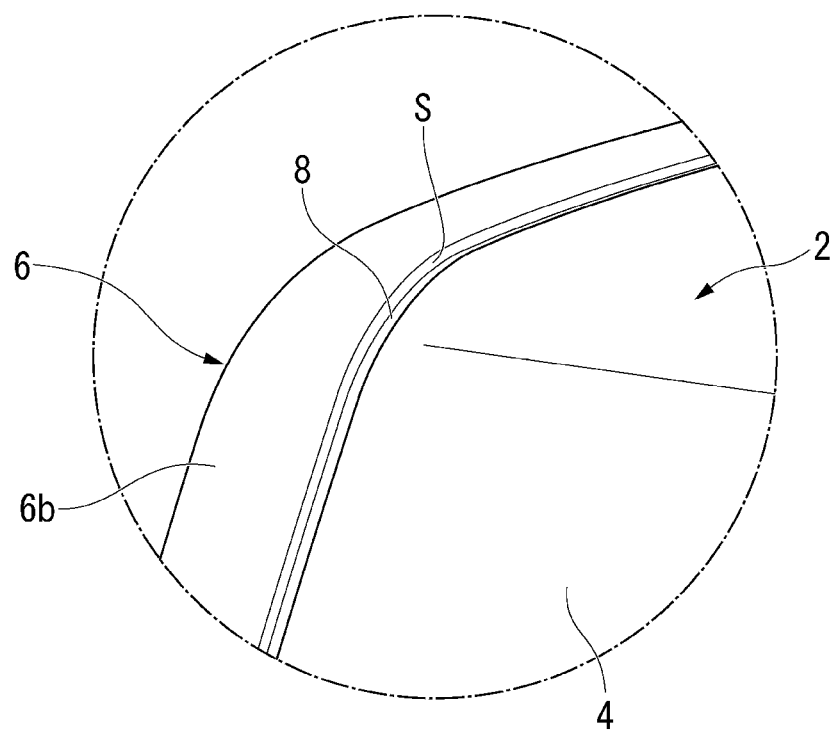
FIG. 4 is an enlarged view of an A-part in FIG. 3.

FIG. 3 is a perspective view of the door mirror 1 viewed from the front side. FIG. 4 is an enlarged view of an A-part in FIG. 3.

Here, as illustrated in FIGS. 3 and 4, the outer wall 6b of the rim portion 6 is formed such that it does not abut the tip of the opening portion 5 in a state of being fitted into the fitting portion 7 of the housing main body 4. That is, in a state where the rim portion 6 is fitted into the fitting portion 7 of the housing main body 4, a gap S is formed between the tip of the opening portion 5 of the housing main body 4 and the outer wall 6b of the rim portion 6. In other words, since the rim portion 6 is fitted into the fitting portion 7 of the housing main body 4, a groove portion 8 is formed between the outer surface of the housing main body 4 and the outer wall 6b of the rim portion 6 and throughout the entire circumference of the rim portion 6 in the mirror housing 2.

(Cut Filter)

Returning to FIG. 1, the cut filter 9 is fitted into the inner wall 6a of the rim portion 6. The cut filter 9 has a plate-like external shape formed to correspond to the inner wall 6a of the rim portion 6.

Figure 5:
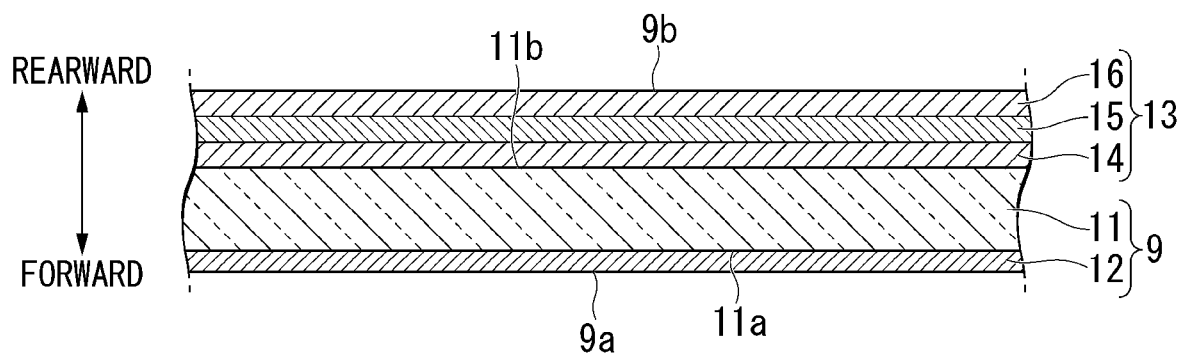
FIG. 5 is a cross-sectional view of the cut filter according to the first embodiment of the present invention.

FIG. 5 is a cross-sectional view of the cut filter 9.

As illustrated in detail in FIG. 5, in the cut filter 9, a glass plate 11 and a filter film 12 which attenuates light having a predetermined wavelength range on a rear surface (surface on the housing main body 4 side) 11a of this glass plate 11 and can reflect light are provided. The cut filter 9 need only be constituted such that light having a predetermined wavelength range is attenuated and light can be reflected. Examples of the cut filter 9 include a half mirror, an electrochromic filter, a polarizing plate, an ND filter, and a low reflection treatment glass.

A surface (rear surface) 11b of the cut filter 9 is subjected to a hydrophilic treatment, and a hydrophilic film 13 is formed thereon. The hydrophilic film 13 has a three-layer structure including a first silica layer 14, a titanium layer 15, and a second silica layer 16, for example, in order from the surface 11b of the cut filter 9. The titanium layer 15 has a photocatalytic function. In addition, the second silica layer 16 has a hydrophilic function.

The surface 11b of the cut filter 9 may be subjected to a water repellent treatment instead of being subjected to a hydrophilic treatment. In this case, a water repellent film (not illustrated) is formed on the surface 11b of the cut filter 9 in place of the hydrophilic film 13.

(Heater)

Returning to FIG. 1, the heater 17 is attached to the rear surface 11a of the cut filter 9. The heater 17 is formed to cover the rear surface 11a of the cut filter 9 in its entirety. Then, opening portions 18 are formed in the heater 17 at places corresponding to cameras 31 and 32 (a main camera 31 and a sub-camera 32) constituting the camera unit 30.

Figure 6:
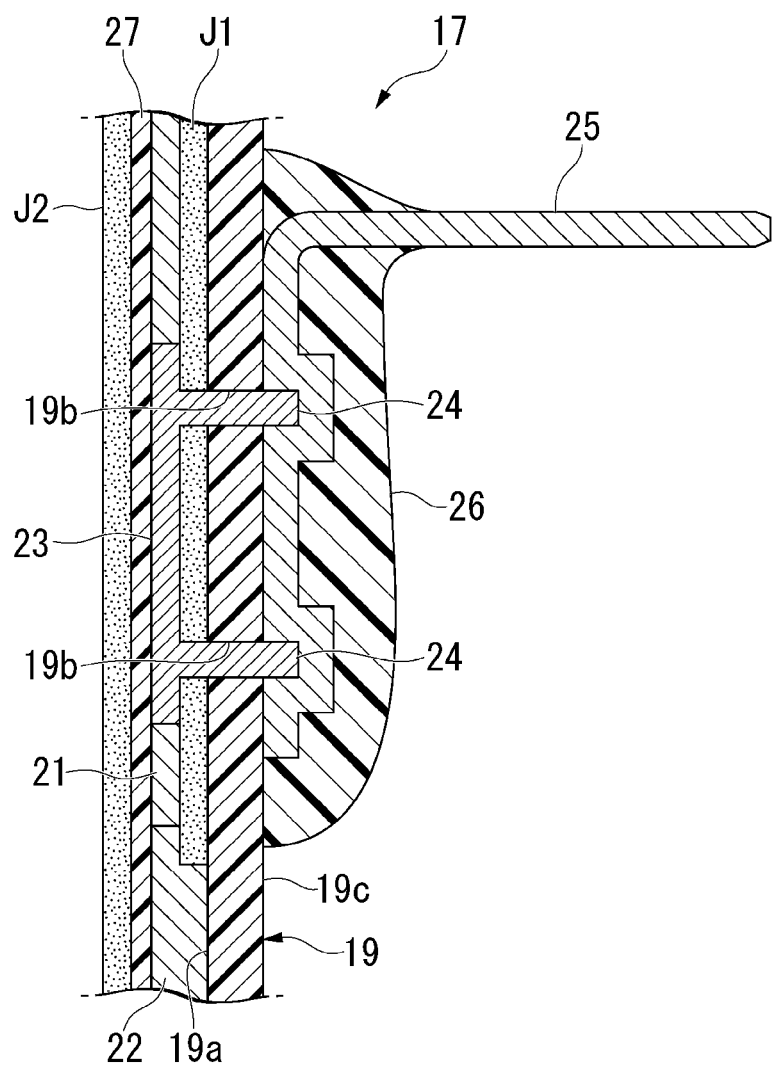
FIG. 6 is a schematic cross-sectional view of a heater according to the first embodiment of the present invention.

FIG. 6 is a schematic cross-sectional view of the heater 17.

As illustrated in detail in FIG. 6, the heater 17 has a base material 19. For example, the base material 19 is formed of polyethylene terephthalate (PET) or the like. A heat-generating element 22, in which a predetermined pattern 21 is formed, is attached to one surface 19a of the base material 19 with an adhesive J interposed therebetween. For example, the pattern 21 is formed of an aluminum alloy or the like and is formed in the heat-generating element 22 in its entirety. For example, the heat-generating element 22 is formed of carbon.

An electrically conductive eyelet 23 is connected to a part of the pattern 21. Terminal connection projections 24 protruding toward the base material 19 side are formed in the eyelet 23. On the other hand, penetration holes 19b through which the terminal connection projections 24 can be inserted are formed in the base material 19. Tips of the terminal connection projections 24 protrude to an opposite surface 19c side of the base material 19 via these penetration holes 19b.

In addition, on the opposite surface 19c of the base material 19, a terminal 25 is provided at a place corresponding to the penetration holes 19b and the terminal connection projections 24. The terminal connection projections 24 are connected to this terminal 25. Then, connection places between the terminal 25 and the terminal connection projections 24 are covered with a sealing agent 26, for example, formed of silicon or the like. Accordingly, the connection places between the terminal 25 and the terminal connection projections 24 are sealed. In addition, since the terminal 25 and the terminal connection projections 24 are connected to each other, the terminal 25 and the pattern 21 are electrically connected to each other via the eyelet 23.

Moreover, surfaces of the pattern 21, the heat-generating element 22, and the eyelet 23 on a side opposite to the base material 19 are covered with a cover film 27.

In such a constitution, for example, an acrylic adhesive J2 is applied to the cover film 27 side, and the heater 17 is attached to a rear surface 9a of the cut filter 9 (refer to FIGS. 1 and 5). The terminal 25 is electrically connected to a control unit 28 (refer to FIG. 1) accommodated inside the mirror housing 2. This control unit 28 constitutes a part of a door mirror system 40 (refer to FIG. 8). The control unit 28 controls a voltage to be applied to the terminal 25 and performs processing of an image captured by the camera unit 30.

(Camera Unit)

Returning to FIGS. 1 and 2, the camera unit 30 accommodated inside the mirror housing 2 is constituted of two cameras 31 and 32, that is, the main camera 31 and the sub-camera 32. Both of the two cameras 31 and 32 are disposed while having lenses 31a and 32a directed toward the rear side. In other words, the two cameras 31 and 32 are disposed such that central axes 31p and 32p are substantially orthogonal to a surface direction of the cut filter 9 (heater 17).

The main camera 31 captures an image of a side behind the side portion of the vehicle body 101 via the opening portions 18 of the heater 17, the cut filter 9, and the opening portion 5 of the mirror housing 2. On the other hand, the sub-camera 32 plays a role of sensing fogging on a surface 9b of the cut filter 9 or water droplets which have adhered to this surface 9b via the opening portion 18 of the heater 17.

Figure 7:
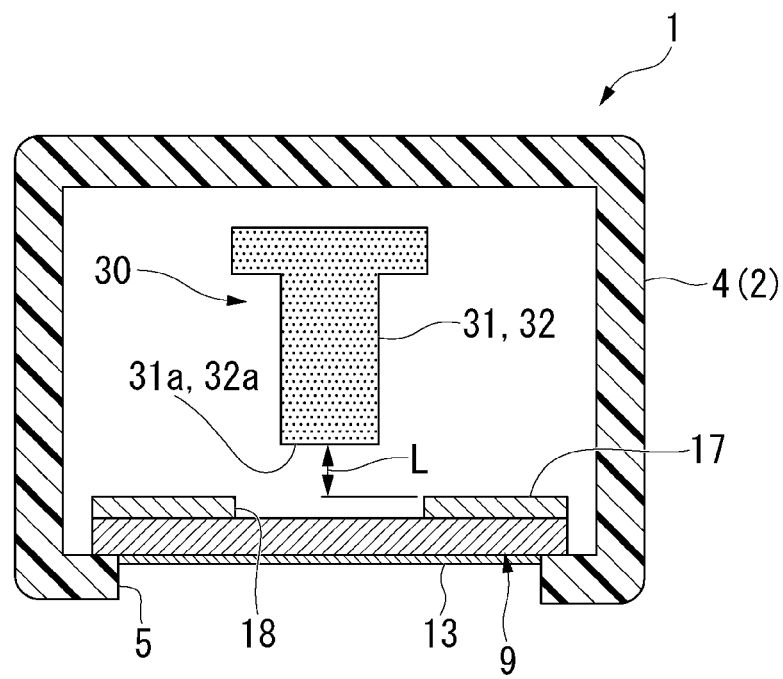
FIG. 7 is a view of a schematic constitution of the door mirror according to the first embodiment of the present invention.

FIG. 7 is a view of a schematic constitution of the door mirror 1.

Here, as illustrated in FIG. 7, a distance L between each of the cameras 31 and 32 and the heater 17 is set to satisfy the following relationship.

$$1 \text{ mm} \leq L \leq 10 \text{ mm} \tag{1}$$

Moreover, it is desirable that the distance L be set to satisfy the following relationship.

$$2 \text{ mm} \leq L \leq 5 \text{ nm} \tag{2}$$

This will be described in detail in description of an operation of the door mirror system 40, which will be described below.

(Door Mirror System)

Figure 8:
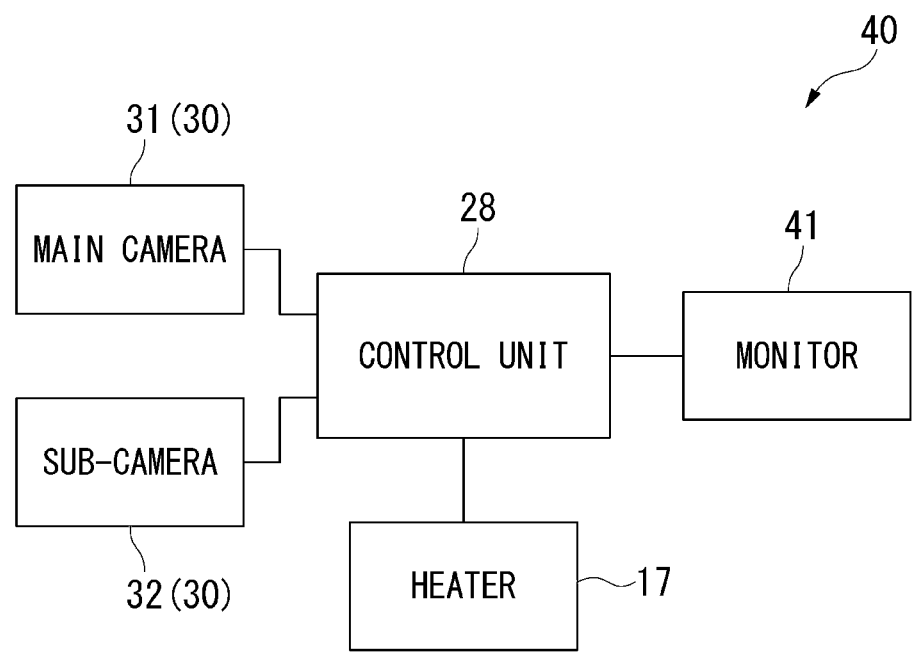
FIG. 8 is a block diagram illustrating a door mirror system according to the first embodiment of the present invention.

FIG. 8 is a block diagram illustrating the door mirror system 40.

As illustrated in FIG. 8, the camera unit 30 described above constitutes a part of the door mirror system 40. In addition to the heater 17, the control unit 28, and the camera unit 30, the door mirror system 40 includes a monitor 41 which is provided inside a vehicle cabin of the vehicle body 101. The monitor 41 is disposed at an arbitrary place which is easily and visually recognized by a driver inside the vehicle cabin. The camera unit 30 and the monitor 41 are connected to the control unit 28.

(Operation of Door Mirror System)

Next, an operation of the door mirror system 40 will be described.

First, a case at the time of fine weather or a case where the cut filter 9 or the lenses 31a and 32a of the cameras 31 and 32 have not fogged will be described.

As illustrated in FIG. 8, an image captured by the camera unit 30 is output to the control unit 28 as a signal. Moreover, the control unit 28 performs processing of the signal received from the camera unit 30 and outputs this processed signal to the monitor 41. The monitor 41 projects a predetermined image based on a signal received from the control unit 28. A driver can check the circumstances on the side behind the side portion of the vehicle body 101 by visually recognizing an image projected in the monitor 41.

Here, each of the cameras 31 and 32, particularly the main camera 31 captures an image of the side behind the side portion of the vehicle body 101 via the cut filter 9. Therefore, a predetermined wavelength range of light input to each of the cameras 31 and 32 from the outside is attenuated. Thus, for example, image capturing of the main camera 31 is prevented from becoming unclear, such as fogging in white at the time of backlighting.

Next, a case at the time of rainy or snowy weather or a case where the cut filter 9 or the lenses 31a and 32a of the cameras 31 and 32 have fogged (which will hereinafter be referred to as a case at the time of rainy weather or the like) will be described.

Figure 9:
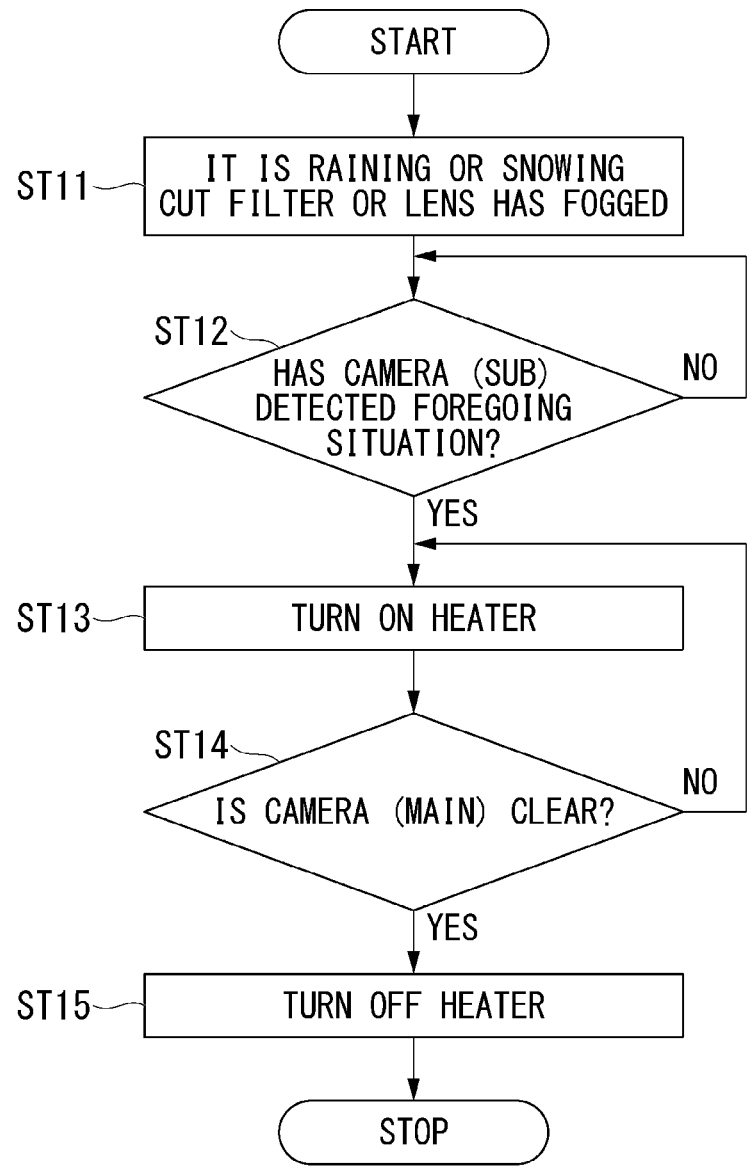

FIG. 9 is a flowchart of the door mirror system 40 at the time of rainy weather or the like.

As illustrated in FIGS. 8 and 9, when raindrops or snow adheres to the cut filter 9 or when the cut filter 9 or the lens 32a of the sub-camera 32 fogs at the time of rainy weather or the like (Step ST11), the control unit 28 determines whether or not the foregoing situation is detected by the sub-camera 32 (Step ST12).

Here, since the main camera 31 is disposed under the same conditions as the sub-camera 32, the state of the lens 31a of the main camera 31 can be identified with the state of the lens 32a of the sub-camera 32. That is, determining whether or not the lens 31a of the main camera 31 has fogged is performed by determining whether or not the lens 32a of the sub-camera 32 has fogged.

When the determination in Step ST12 is "No", that is, when the sub-camera 32 does not detect that raindrops or snow has adhered to the cut filter 9, or the cut filter 9 or the lens 32a of the sub-camera 32 has fogged, the determination in Step ST12 is performed again.

On the other hand, when the determination in Step ST12 is "Yes", that is, when the sub-camera 32 detects that raindrops or snow has adhered to the cut filter 9, or the cut filter 9 or the lens 32a of the sub-camera 32 has fogged, the control unit 28 causes a voltage to be applied to the terminal 25 of the heater 17. That is, the heater 17 is turned on (Step ST13). When a predetermined voltage is applied to the terminal 25, the voltage is applied to the pattern 21 via the eyelet 23, and the heat-generating element 22 generates heat. Consequently, the cut filter 9 is heated.

When the cut filter 9 is heated, raindrops or snow which has adhered to the cut filter 9 is vaporized. Accordingly, the field of view of the cut filter 9 becomes favorable. In addition, since the cameras 31 and 32 are disposed adjacent to the heater 17, fogging on the lens 32a of each of the cameras 31 and 32 is eliminated due to heat generated by the heater 17 (heat-generating element 22), and the field of view of each of the cameras 31 and 32 also becomes favorable.

Then, the control unit 28 determines whether or not an image captured by the main camera 31 is clear (Step ST14).

When the determination in Step ST14 is "No", that is, when the control unit 28 determines that an image captured by the main camera 31 is still unclear, the heater 17 remains turned on. In addition, the determination in Step ST14 is performed again.

On the other hand, when the determination in Step ST14 is "Yes", that is, when the control unit 28 determines that an image captured by the main camera 31 has become clear, the heater 17 is turned off and the processing of the door mirror system 40 is completed.

(Action of Mirror Housing)

Incidentally, the groove portion 8 is formed between the outer surface of the housing main body 4 and the outer wall 6b of the rim portion 6 and throughout the entire circumference of the rim portion 6 in the mirror housing 2 of the door mirror 1. Therefore, for example, raindrops adhering to the housing main body 4 while the vehicle 100 travels when it rains do not infiltrate to the cut filter 9 side.

Specific description will be given based on FIG. 10.

Figure 10:
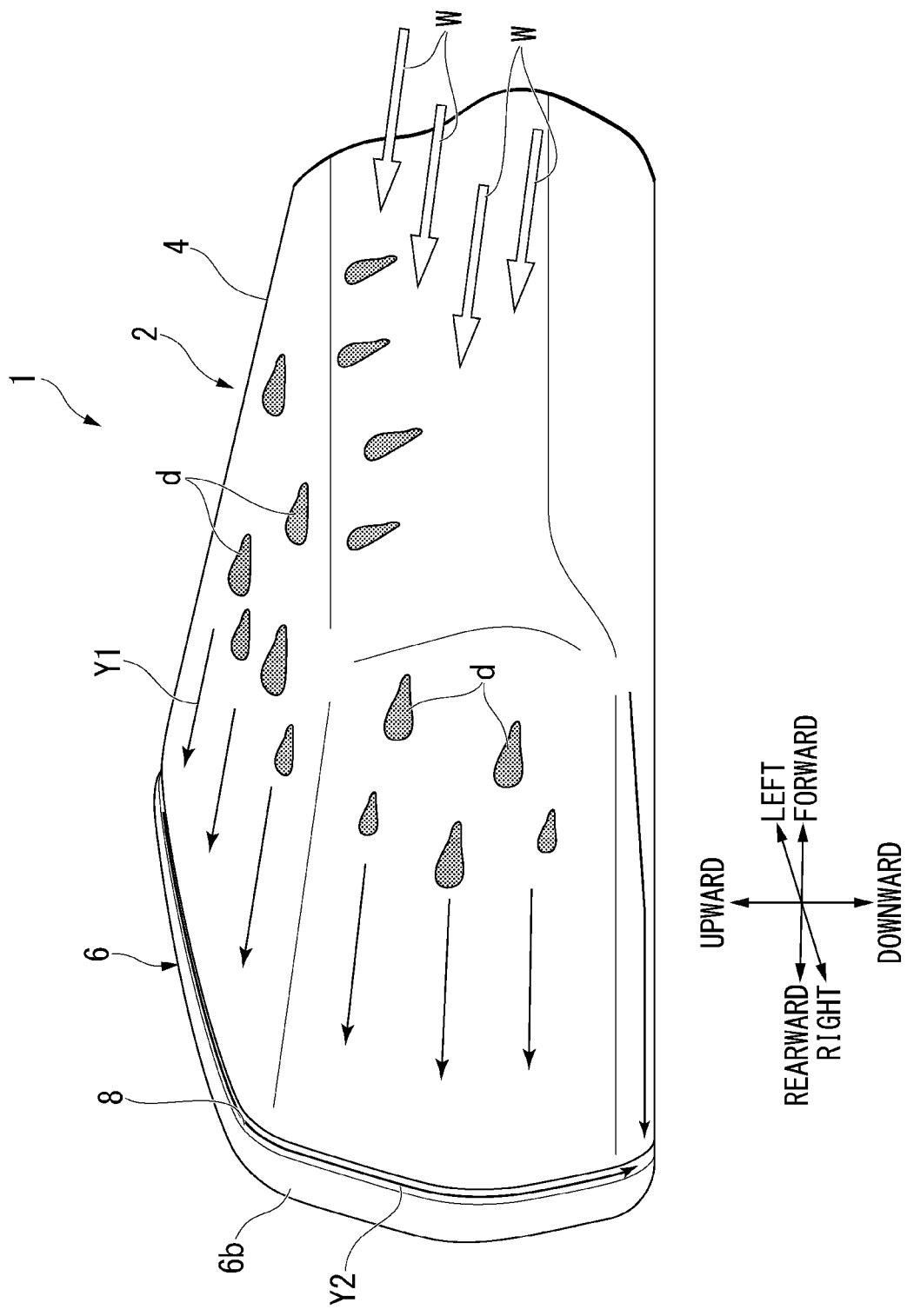
FIG. 10 is a view describing an action of a mirror housing according to the first embodiment of the present invention while a vehicle travels when it rains.

FIG. 10 is a view describing an action of the mirror housing 2 while the vehicle 100 travels when it rains.

As illustrated in FIG. 10, raindrops d which have adhered to the outer surface of the housing main body 4 receive traveling air W and move rearward (arrow Y1) on the outer surface of the housing main body 4.

When the raindrops d arrive at the groove portion 8, rearward movement of the raindrops d is hindered due to this groove portion 8. Then, the raindrops d receive the influence of gravity and move downward along the groove portion 8 (arrow Y2). Thereafter, the raindrops d which have moved to a lower surface of the housing main body 4 receive the influence of gravity and the traveling air W and scatter rearward. Therefore, the raindrops d can be prevented from infiltrating into the cut filter 9 via the rim portion 6 of the mirror housing 2.

In this manner, in the first embodiment described above, in the door mirror 1, the camera unit 30 (the main camera 31 and the sub-camera 32) and the heater 17 attached to the rear surface 11a of the cut filter 9 are disposed adjacent to each other. Therefore, the heater 17 not only vaporizes the raindrops d which have adhered to the cut filter 9 or eliminates fogging on the cut filter but also eliminates fogging on the lens 32a of each of the cameras 31 and 32. Thus, the field of view of each of the cameras 31 and 32 can be made favorable.

Here, the distance L (refer to FIG. 7) between each of the cameras 31 and 32 and the heater 17 is set to satisfy the foregoing Expression (1). Therefore, water droplets can be prevented from remaining in a gap between the heater 17 (cut filter 9) and each of the cameras 31 and 32 due to an excessively narrow gap between the heater 17 and each of the cameras 31 and 32, for example, caused by the surface tension of the water droplets which have adhered thereto. Moreover, the lenses 31a and 32a of the cameras 31 and 32 can be heated efficiently by the heater 17.

Figure 11:
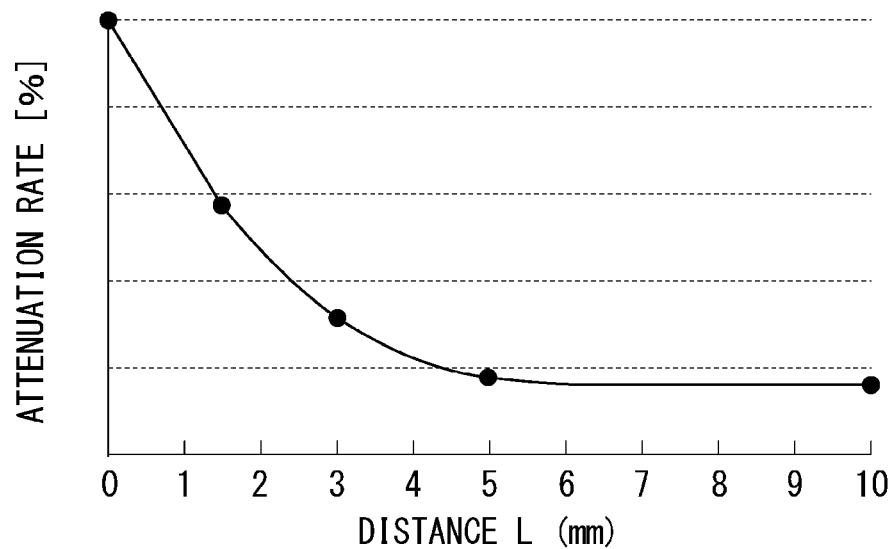
FIG. 11 is a graph showing a relationship between a distance between each of cameras and the heater and an attenuation rate of a lens of each of the cameras according to the first embodiment of the present invention.

FIG. 11 is a graph showing change in attenuation rate in a case where the vertical axis indicates the attenuation rate [%] for the temperature drop when the lenses 31a and 32a of the cameras 31 and 32 are heated by the heater 17 and the horizontal axis indicates the distance L between each of the cameras 31 and 32 and the heater 17.

As illustrated in FIG. 11, if the distance L is within a range satisfying Expression (1), it is possible to confirm that the lenses 31a and 32a of the cameras 31 and 32 can be heated moderately by the heater 17.

Moreover, as seen in FIG. 11, if the distance L exceeds 5 mm, it is possible to confirm that there is little change in attenuation rate. Therefore, the lenses 31a and 32a of the cameras 31 and 32 can be heated more efficiently without allowing water droplets to remain between the heater 17 and each of the cameras 31 and 32 by setting the distance L within a range satisfying Expression (2). In addition, space saving in the housing main body 4 can be achieved and the door mirror 1 can be reduced in size by setting the distance L such that Expression (2) is satisfied.

Here, when an ordinary mirror (which will hereinafter be referred to as a door mirror in the related art) is provided in the door mirror 1 and a driver visually recognizes the side behind the side portion of the vehicle body 101 through a specular image on this door mirror in the related art, there is a need to sufficiently increase the size of the mirror. However, in the door mirror 1 of the present embodiment, a driver can visually recognize the side behind the side portion of the vehicle body 101 through the camera unit 30. As a result, compared to the size of the mirror in the door mirror in the related art, the size of the cut filter 9 can be reduced. Therefore, compared to a time for the heater 17 to heat the mirror in the door mirror in the related art and to obtain a clear specular image on this mirror, a time for the heater 17 to heat the cut filter 9 to obtain a favorable field of view of this cut filter 9 can be shortened.

Figure 12:
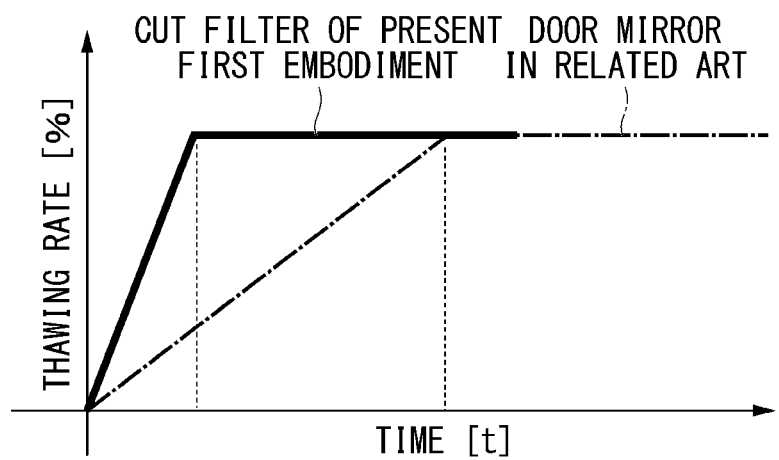
FIG. 12 is a graph showing a difference between a thawing rate of the cut filter of the first embodiment of the present invention and a thawing rate of a door mirror in the related art.

FIG. 12 is a graph showing change in thawing rate in a case where the vertical axis indicates the thawing rate [%] when the mirror in the door mirror in the related art and the cut filter 9 are heated by the heater 17 and the horizontal axis indicates the time [t] for the heater 17 to heat the mirror in the door mirror in the related art and the cut filter 9.

As illustrated in FIG. 12, compared to the mirror in the door mirror in the related art, it is possible to confirm that the thawing rate of the cut filter 9 rises in a short period of time.

In addition, each of the cameras 31 and 32, particularly the main camera 31 captures an image of the side behind the side portion of the vehicle body 101 via the cut filter 9. As a result, a predetermined wavelength range of light input to each of the cameras 31 and 32 from the outside is attenuated. Therefore, for example, image capturing of the main camera 31 can be prevented from becoming unclear, such as fogging in white at the time of backlighting. Thus, unclear image capturing at the time of backlighting or the like can be curbed even when the camera unit 30 (main camera 31) is highly sensitive.

In addition, as the cut filter 9, a half mirror, an electrochromic filter, a polarizing plate, an ND filter, a low reflection treatment glass, or the like is adopted. Due to such a constitution of the cut filter 9, the quantity of light incident on the camera unit 30 can be reduced reliably by the cut filter 9. In addition, an image of the side behind the side portion of the vehicle body 101 can be captured reliably by the camera unit 30 (main camera 31) via the cut filter 9.

Moreover, the surface (rear surface) 11b of the cut filter 9 is subjected to a hydrophilic treatment, and the hydrophilic film 13 is formed thereon. Therefore, for example, even when water droplets adhere to the cut filter 9, it is possible to prevent a state where the water droplets spread quickly and the water droplets having adhered to the cut filter 9 remain. Therefore, the field of view of the cut filter 9 can be prevented from being reduced.

In addition, if the surface 11b of the cut filter 9 is subjected to a water repellent treatment instead of a hydrophilic treatment, for example, even when water droplets adhere to the cut filter 9, the water droplets are repelled. As a result, it is possible to prevent a state where water droplets having adhered to the cut filter 9 remain. Therefore, the field of view of the cut filter 9 can be prevented from being reduced.

Moreover, the rim portion 6 is fitted into the opening portion 5 of the housing main body 4 and the cut filter 9 is fitted into the rim portion 6, so that the opening portion 5 of the housing main body 4 is blocked. Therefore, the cut filter 9 can be fixed reliably to the mirror housing 2. In addition, entry of water droplets, dust, or the like into the mirror housing 2 can be curbed.

In addition, in the mirror housing 2, the groove portion 8 is formed between the outer surface of the housing main body 4 and the outer wall 6b of the rim portion 6 and throughout the entire circumference of the rim portion 6. Therefore, for example, raindrops adhering to the housing main body 4 while the vehicle 100 travels when it rains can be prevented from infiltrating to the cut filter 9 side. Thus, the field of view of the cut filter 9 can be more reliably prevented from being reduced.

Second Embodiment

Next, a second embodiment will be described based on FIGS. 13 and 14.

Figure 13:
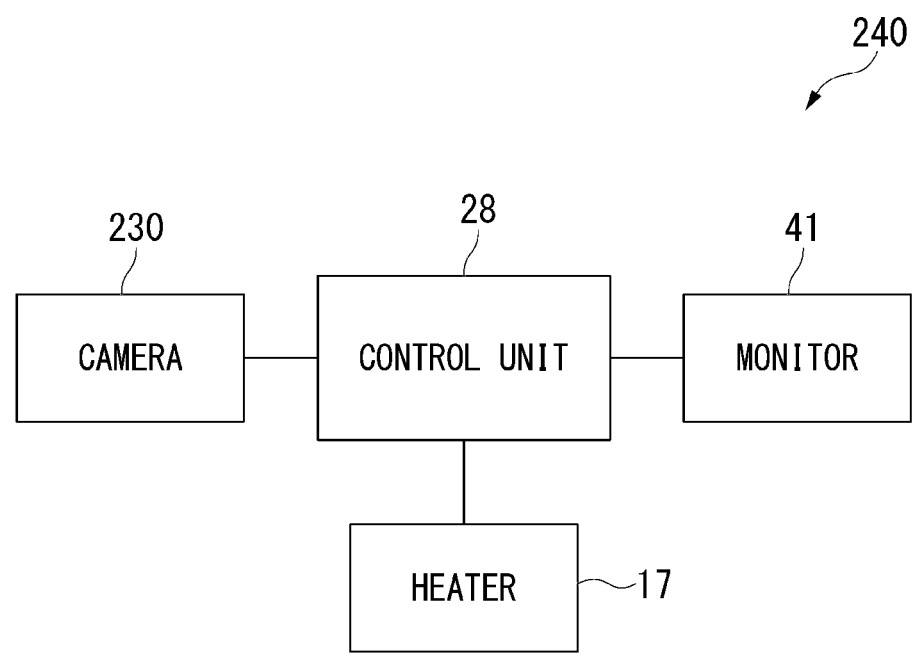
FIG. 13 is a block diagram illustrating a door mirror system according to a second embodiment of the present invention.

FIG. 13 is a block diagram illustrating a door mirror system 240 according to the second embodiment. In the second embodiment, regarding the same aspects as the first embodiment described above, the same reference signs are applied to those in FIG. 13, and description will be omitted.

As illustrated in FIG. 13, regarding the difference between the first embodiment and the second embodiment, in the first embodiment, two cameras 31 and 32 (the main camera 31 and the sub-camera 32) are used as the camera unit 30. In contrast, in the second embodiment, one camera 230 is used, and this camera 230 plays two roles, such as a role of the main camera 31 and a role of the sub-camera 32 in the first embodiment. That is, the door mirror system 240 includes the heater 17, the control unit 28, the camera 230, and the monitor 41.

(Operation of Door Mirror System)

Next, an operation of the door mirror system 240 will be described.

Here, since a case at the time of fine weather or a case where the cut filter 9 or a lens (not illustrated in the present second embodiment) of the camera 230 has not fogged is similar to that in the first embodiment described above, description will be omitted. Here, the camera 230 is similar to each of the cameras 31 and 32 in the first embodiment described above in that the camera 230 is disposed such that the central axis is substantially orthogonal to the surface direction of the cut filter 9 (heater 17).

Next, a case at the time of rainy weather or the like will be described.

Figure 14:
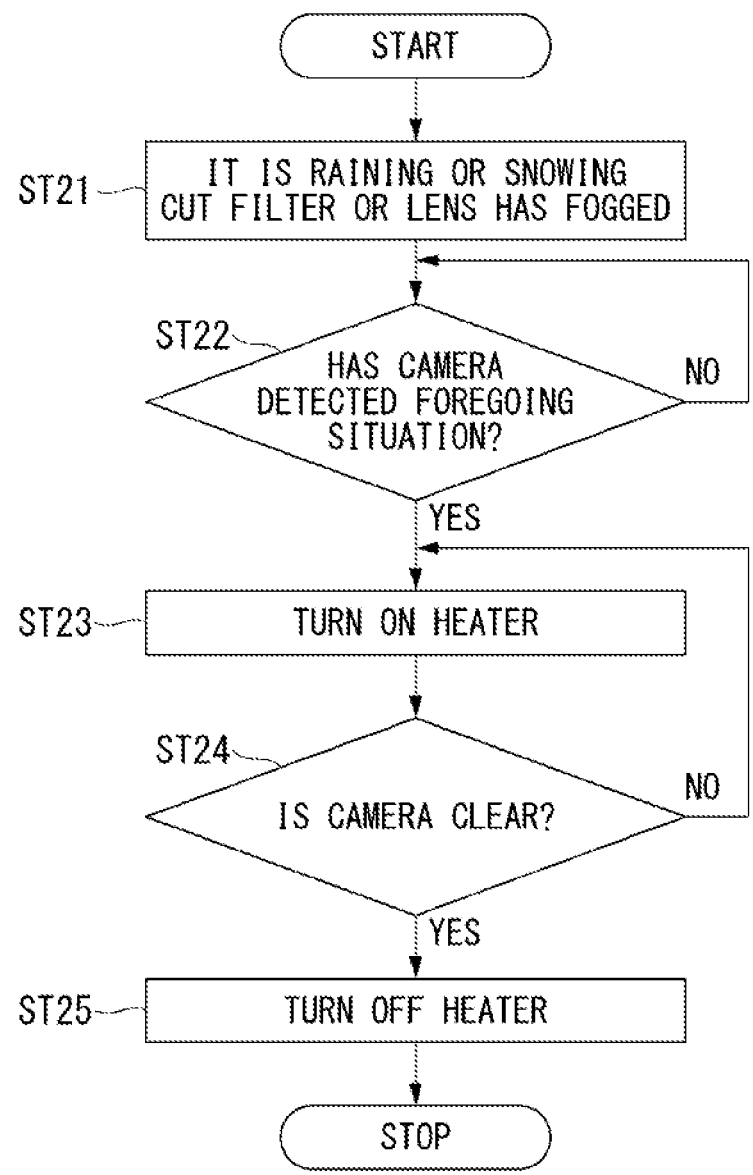

FIG. 14 is a flowchart of the door mirror system 240 at the time of rainy weather or the like.

As illustrated in FIGS. 13 and 14, when raindrops or snow adheres to the cut filter 9 or when the cut filter 9 or the lens of the camera 230 fogs at the time of rainy weather or the like (Step ST21), the control unit 28 determines whether or not the foregoing situation is detected by the camera 230 (Step ST22).

When the determination in Step ST22 is "No", that is, when the camera 230 does not detect that raindrops or snow has adhered to the cut filter 9, or the cut filter 9 or the lens of the camera 230 has fogged, Step ST22 is performed again.

On the other hand, when the determination in Step ST22 is "Yes", that is, when the camera 230 detects that raindrops or snow has adhered to the cut filter 9, or the cut filter 9 or the lens of the camera 230 has fogged, the control unit 28 turns on the heater 17 (Step ST23).

When the cut filter 9 is heated by turning on the heater 17, raindrops or snow which has adhered to the cut filter 9 is vaporized. Accordingly, the field of view of the cut filter 9 becomes favorable. In addition, since the camera 230 is disposed adjacent to the heater 17, fogging on the lens of the camera 230 is eliminated by the heater 17, and the field of view of the camera 230 also becomes favorable.

Then, the control unit 28 determines whether or not an image captured by the camera 230 is clear (Step ST24).

When the determination in Step ST24 is "No", that is, when the control unit 28 determines that an image captured by the camera 230 is still unclear, the heater 17 remains turned on. In addition, the determination in Step ST24 is performed again.

On the other hand, when the determination in Step ST24 is "Yes", that is, when the control unit 28 determines that an image captured by the camera 230 has become clear, the heater 17 is turned off and the processing of the door mirror system 240 is completed (Step ST25).

Therefore, according to the second embodiment described above, it is possible to exhibit effects similar to those in the first embodiment described above. In addition, compared to the camera unit 30 of the first embodiment, one camera 230 plays two roles, such as a role of the main camera 31 and a role of the sub-camera 32 in the first embodiment. Therefore, the constitution of the door mirror system 240 can be simplified, and the mirror housing 2 (refer to FIGS. 1 and 2) can be further reduced in size.

The present invention is not limited to the first embodiment and the second embodiment described above and includes various modifications applied to the first embodiment and the second embodiment described above within a range not departing from the gist of the present invention.

For example, the shape of the mirror housing 2 is not limited to a shape constituted of the support portion 3 and the housing main body 4 as described above, and the shape can be changed arbitrarily.

In addition, in the first embodiment and the second embodiment described above, a case where each of the cameras 31, 32, and 230 is disposed such that the central axes 31$p$ and 32$p$ are substantially orthogonal to the surface direction of the cut filter 9 (heater 17) has been described. However, the embodiments are not limited thereto, and each of the cameras 31, 32, and 230 need only be disposed such that the central axes 31$p$ and 32$p$ intersect the surface direction of the cut filter 9 (heater 17).

Third Embodiment

Next, with reference to FIG. 5, a third embodiment will be described based on FIGS. 15 to 22.

(Door Mirror)

Figure 15:
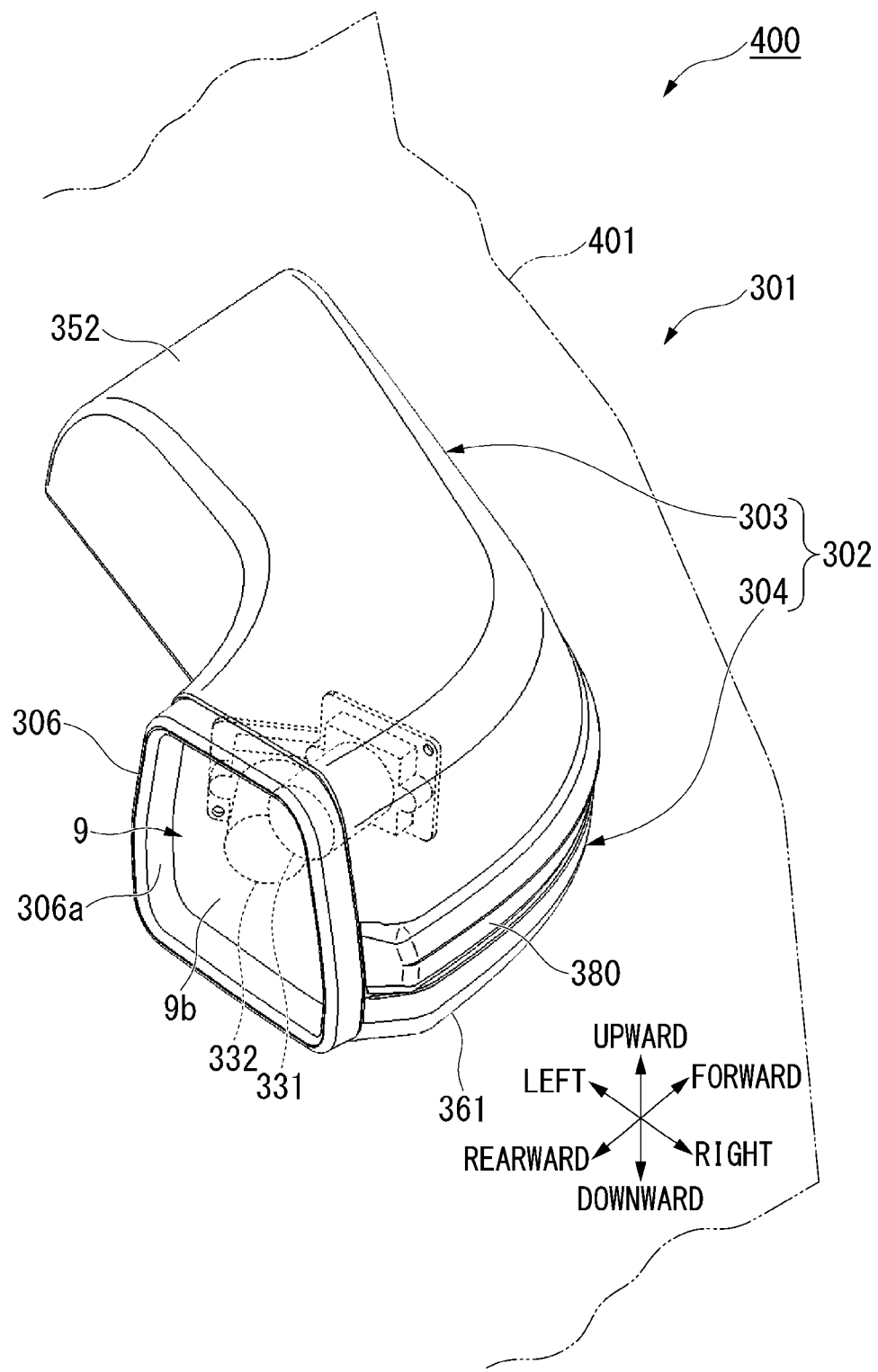
FIG. 15 is an exploded perspective view of a door mirror according to a third embodiment of the present invention viewed from the rear side in the traveling direction.
Figure 16:
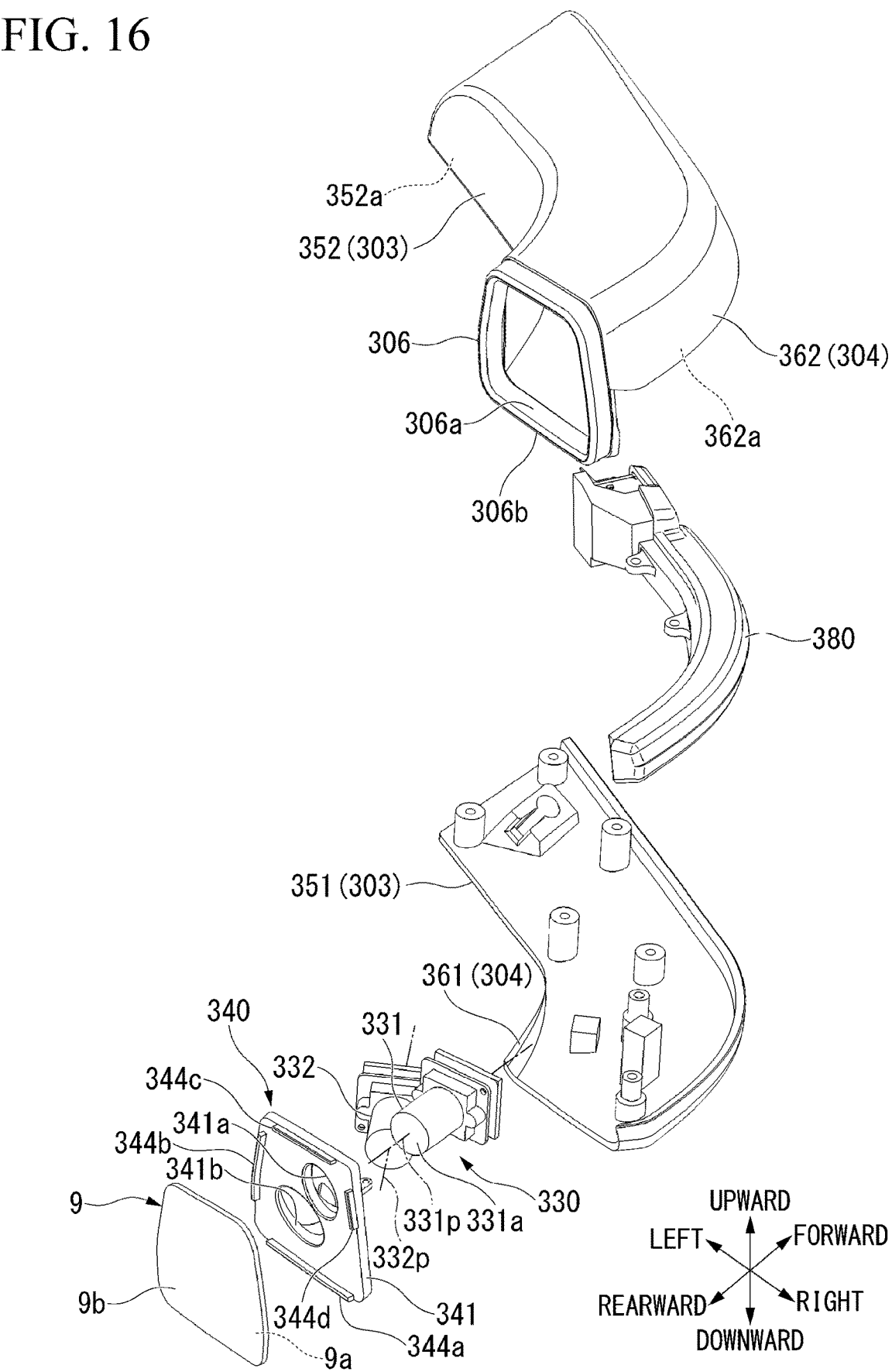
FIG. 16 is an exploded perspective view of the door mirror according to the third embodiment of the present invention viewed from the rear side in the traveling direction.

FIG. 15 is a perspective view of a door mirror 301 viewed from the rear side in the traveling direction of a vehicle 400. FIG. 16 is an exploded perspective view of FIG. 15.

In FIGS. 15 and 16, the door mirror 301 indicates a door mirror which is provided on the driver's seat side, that is, in the right side portion of the vehicle body 101 in the traveling direction. In addition, in description of the following embodiment, forward and rearward in the traveling direction will be simply referred to as the front-rear direction, the right side in the vehicle width direction while heading in the traveling direction will be simply referred to as the right side, the left side will be simply referred to as the left side, and the up-down direction of the gravity direction will be simply referred to as the up-down direction.

As illustrated in FIGS. 15 and 16, the door mirror 301 includes a mirror housing 302 which is provided in the right side portion of a vehicle body 401, the cut filter 9 which is fitted into an opening portion 306$a$ of the mirror housing 302 on the rear side, disposed on a surface in front of the cut filter 9, a protector 340 which is provided in the mirror housing 302 to block the opening portion 306$a$, and a camera unit 330 which is accommodated inside the mirror housing 302.

The door mirrors 301 are provided in the right side portion and the left side portion of the vehicle body 401. Two door mirrors 301 are constituted in a line-symmetrical manner about the middle in the vehicle width direction and have the same basic constitution. Therefore, in the following description, only the door mirror 1 on the driver's seat side will be described, and description of the door mirror 301 on the passenger seat side will be omitted.

(Mirror Housing)

The mirror housing 302 is formed of a resin or the like. The mirror housing 302 is constituted of a support portion 303 which protrudes toward the right side from the vehicle body 401, and a housing main body 304 which is formed integrally with a tip of the support portion 303. In addition, the support portion 303 and the housing main body 304 are constituted to be able to be separated from each other in the up-down direction.

That is, the support portion 303 is constituted of a plate-shaped support side base portion 351 and a support side cover 352 which has a substantially U-shaped cross section and covers the support side base portion 351 from above. The support side cover 352 is disposed while having an opening portion 352$a$ directed toward the support side base portion 351 side. Then, the support side base portion 351 and the support side cover 352 constitute a closed cross section.

On the other hand, the housing main body 304 is constituted of a main body side base portion 361 which extends outward (to the right side) in the vehicle width direction from the support side base portion 351, and a main body side cover 362 which extends outward in the vehicle width direction from the support side cover 352. Then, the support side base portion 351 and the main body side base portion 361 are formed integrally with each other. In addition, the support side cover 352 and the main body side cover 362 are formed integrally with each other.

The main body side base portion 361 is formed to be curved rearward from the outermost end (right end) of the support side base portion 351 in the vehicle width direction.

On the other hand, the main body side cover 362 is formed to have a substantially U-shaped cross section corresponding to the shape of the support side cover 352. In addition, the main body side cover 362 is formed to be curved rearward from the outermost end (right end) of the support side cover 352 in the vehicle width direction so as to correspond to the extending direction of the main body side base portion 361. Then, the main body side cover 362 is disposed while having an opening portion 362$a$ directed toward the main body side base portion 361. Accordingly, the main body side base portion 361 and the main body side cover 362 constitute a closed cross section.

In addition, in the housing main body 304, a side turn lamp 380 is provided between the main body side base portion 361 and the main body side cover 362 from a front side surface to a right side surface. The side turn lamp 380 has a direction indicating function.

Moreover, a substantially quadrangular frame-shaped rim portion 306 constituting the opening portion 306$a$ of the mirror housing 302 on the rear side is provided in the housing main body 304. A substantially upper half portion of the rim portion 306 is integrated with the main body side cover 362.

Figure 17:
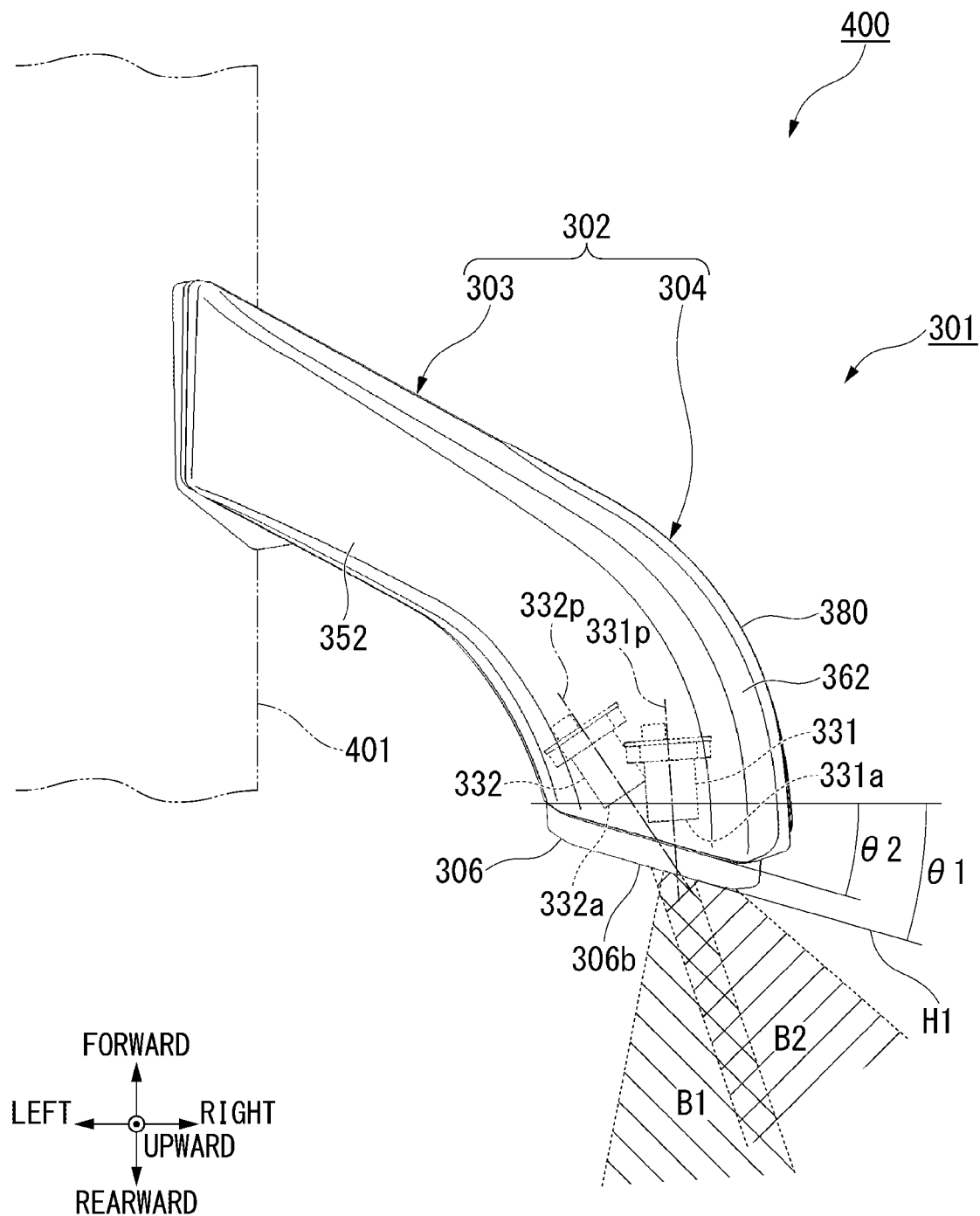
FIG. 17 is a plan view of the door mirror according to the third embodiment of the present invention viewed from above.

FIG. 17 is a plan view of the door mirror 301 viewed from above.

As illustrated in FIG. 17, the rim portion 306 is formed such that an angle θ1 (which will hereinafter be referred to as a tilting angle θ1 of the rim portion 6) of an imaginary plane HI passing through a circumferential edge portion 306b on the rear side with respect to the left-right direction (vehicle width direction) is within a range of 15° to 30°. The cut filter 9 is fitted into an inner circumferential edge of the opening portion 306a of the rim portion 306 having such a constitution.

(Camera Unit)

Figure 18:
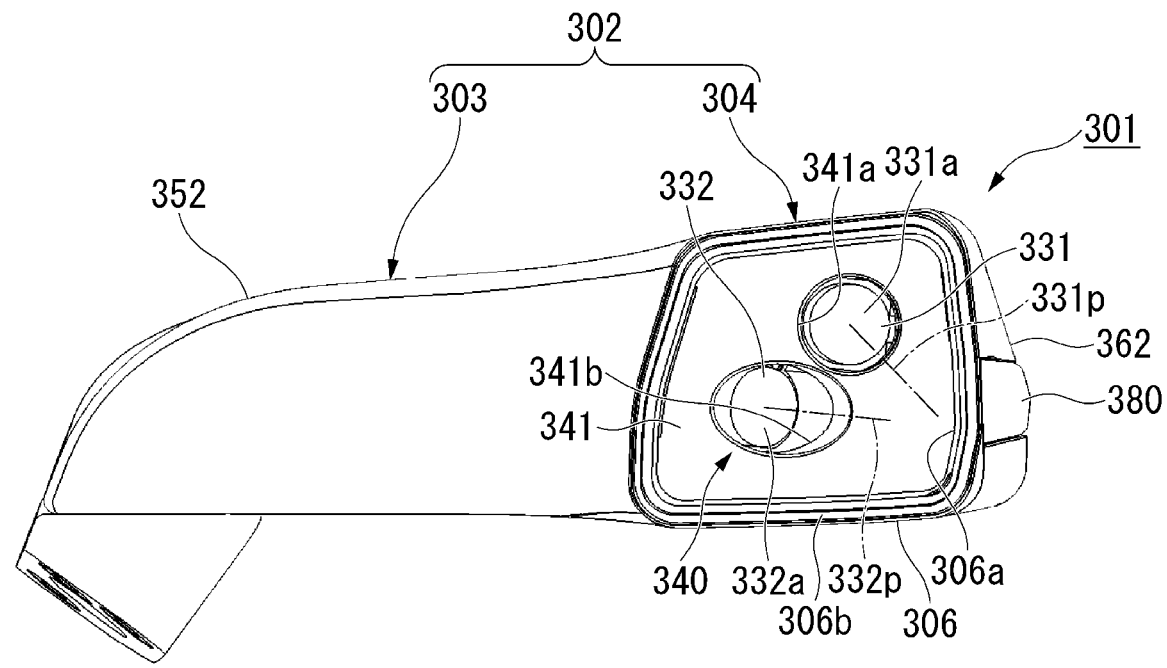
FIG. 18 is a plan view of the door mirror according to the third embodiment of the present invention viewed from behind and illustrates a state where a cut filter is detached.

FIG. 18 is a plan view of the door mirror 301 viewed from behind and illustrates a state where the cut filter 9 is detached.

As illustrated in FIGS. 16, 17, and 18, the camera unit 330 is accommodated inside the housing main body 304 of the mirror housing 302. The camera unit 330 is constituted of two cameras 331 and 332, such as a main camera 331 and a sub-camera 332. Regarding the two cameras 331 and 332, the sub-camera 332 is disposed on the vehicle body 401 side of the mirror housing 302, and the main camera 331 is disposed on the right side that is a side opposite to the vehicle body 401 side of the mirror housing 302.

In addition, both of the two cameras 331 and 332 are disposed while having lenses 331a and 332a directed toward the rear side. More specifically, the main camera 331 is disposed while having the lens 331a directed toward the rear side in a state where a central axis 331p tilts slightly outward (to the right side) in the vehicle width direction with respect to the surface direction of the cut filter 9. In addition, the sub-camera 332 is disposed while having the lens 332a directed toward the rear side in a state where a central axis 332p tilts further outward (to the right side) in the vehicle width direction than the central axis 331p of the main camera 331. That is, as illustrated in detail in FIG. 17, compared to an image-capturing range B1 of the main camera 331, an image-capturing range B2 of the sub-camera 332 has a shape directed outward in the vehicle width direction. In addition, although the image-capturing range B2 of the sub-camera 332 is directed outward in the vehicle width direction compared to the image-capturing range B1 of the main camera 331, since the sub-camera 332 is disposed on the vehicle body 401 side (inward in the vehicle width direction) of the main camera 331, the rim portion 306 is not projected in the sub-camera 332.

Moreover, the main camera 331 is disposed above the sub-camera 332. Then, the two cameras 331 and 332 are disposed to partially overlap each other when viewed in a height direction (up-down direction) of the vehicle body 401.

The main camera 331 disposed in this manner captures an image of the side behind the side portion of the vehicle body 401. On the other hand, the sub-camera 332 plays a role of sensing fogging on the lens 332a of this sub-camera 332, water droplets which have adhered to the lens 332a, or the like and sensing fogging on the surface 9b of the cut filter 9 or water droplets which have adhered to the surface 9b. The sub-camera 332 may be set to detect (sense) an obstacle or a person on a side outward in the vehicle width direction of the vehicle 400. In addition, in the following description, the sub-camera 332 performing such sensing will sometimes be simply referred to as a sensor sub-camera 332 or the like.

(Protector)

Figure 19:
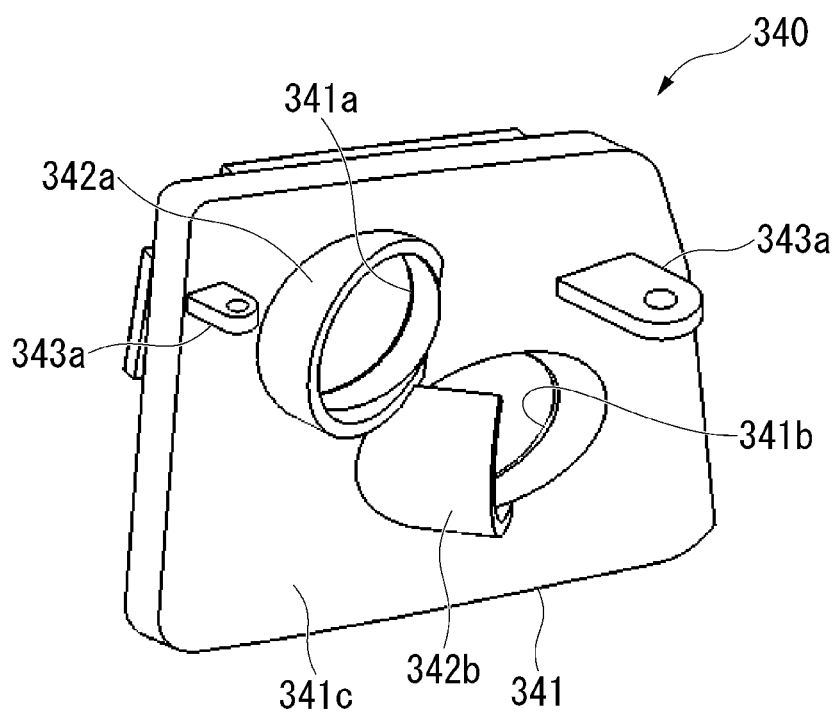
FIG. 19 is a perspective view of a protector according to the third embodiment of the present invention.

FIG. 19 is a perspective view of the protector 340.

As illustrated in FIGS. 16 and 19, the protector 340 protects the camera unit 330. The protector 340 is disposed between the cut filter 9 and the camera unit 330 inside the mirror housing 302. The protector 340 is formed of a resin and has a main body portion 341 formed to have a plate shape such that the opening portion 306a of the mirror housing 302 (rim portion 306) is blocked. In other words, the main body portion 341 is formed to have a substantially quadrangular plate shape in plan view corresponding to the shape of the cut filter 9 such that the rear surface 9a of the cut filter 9 is covered.

In the main body portion 341, opening portions 341a and 341b (a first opening portion 341a and a second opening portion 341b) are formed at positions corresponding to the cameras 331 and 332, respectively. The main camera 331 captures an image of the side behind the side portion of the vehicle body 401 via the first opening portion 341a and via the cut filter 9 thereafter. In addition, the sub-camera 332 performs sensing via the second opening portion 341b and via the cut filter 9 thereafter.

In addition, in the main body portion 341, light-shielding portions 342a and 342b (a first light-shielding portion 342a and a second light-shielding portion 342b) are formed to protrude toward the cameras 331 and 332 from the circumferential edges of the opening portions 341a and 341b, respectively. The first light-shielding portion 342a protrudes from the circumferential edge of the first opening portion 341a and is formed to have a substantially cylindrical shape such that the surrounding area of the lens 331a of the main camera 331 is covered. In addition, the second light-shielding portion 342b protrudes from the circumferential edge of the second opening portion 341b and is formed to have a substantially cylindrical shape such that the surrounding area of the lens 332a of the sub-camera 332 is covered.

The light-shielding portions 342a and 342b prevent an excessive quantity of light from being incident on the lenses 331a and 332a of the cameras 331 and 332. Therefore, a black resin or the like having excellent light-shielding properties is used for the light-shielding portions 342a and 342b, or a paint having excellent light-shielding properties is applied thereto. The light-shielding portions 342a and 342b need only be materials or paints having light-shielding properties. For example, the light-shielding portions 342a and 342b can also be formed of a semitransparent resin. In addition, the light-shielding portions 342a and 342b and the main body portion 341 can be formed of the same material, or the same paint can be applied thereto. In addition, the light-shielding portions 342a and 342b and the main body portion 341 can be formed of materials different from each other, or different paints can be applied thereto. At least the light-shielding portions 342a and 342b need only have light-shielding properties.

In addition, in the main body portion 341, attachment stays 343a and 343b are formed in a protruding manner on a rear surface 341c side where the light-shielding portions 342a and 342b protrude. Each of the attachment stays 343a and 343b fixes the protector 340 to the mirror housing 302.

Moreover, on a surface 341d on a side opposite to the rear surface 341c of the main body portion 341, ribs 344a, 344b, 344c, and 344d are formed respectively on four sides to protrude toward the cut filter 9 side (rearward). In addition, each of the ribs 344a, 344b, 344c, and 344d is formed to extend along each side. Each of the ribs 344a, 344b, 344c, and 344d forms a predetermined gap between the main body portion 341 and the cut filter 9 and performs positioning of the main body portion 341 with respect to the cut filter 9.

(Door Mirror System)

Figure 20:
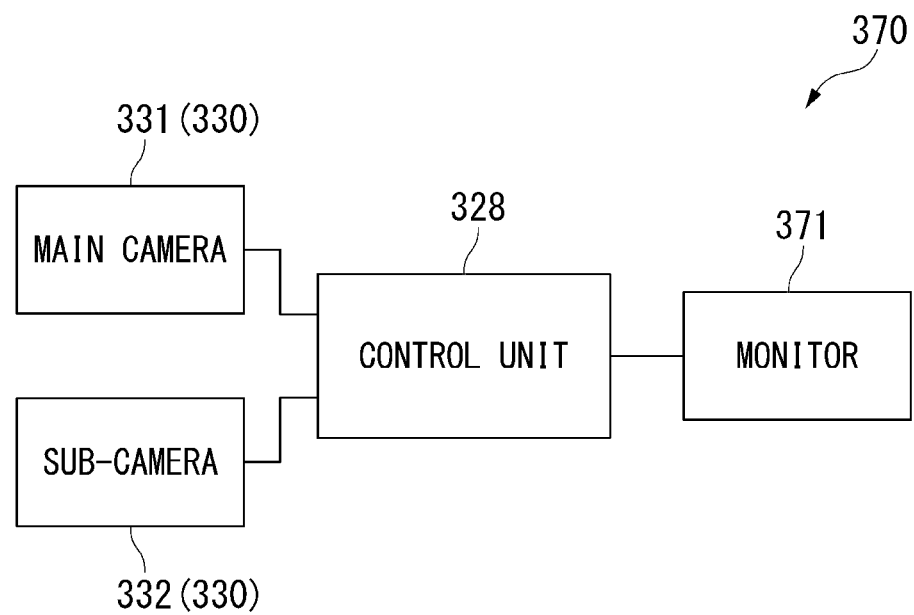
FIG. 20 is a block diagram illustrating a door mirror system according to the third embodiment of the present invention.

FIG. 20 is a block diagram illustrating a door mirror system 370.

As illustrated in FIG. 20, the camera unit 330 described above constitutes a part of the door mirror system 370. In addition to the camera unit 330, the door mirror system 370 includes a control unit 328 which is accommodated inside the mirror housing 302, and a monitor 371 which is provided inside the vehicle cabin of the vehicle body 401. The monitor 371 is disposed at an arbitrary place which is easily and visually recognized by a driver inside the vehicle cabin. The camera unit 330 and the monitor 371 are connected to the control unit 328.

(Operation of Door Mirror System)

Next, an operation of the door mirror system 370 will be described.

First, a case where no obstacle is present on the side behind the side portion of the vehicle body 401 and a mark, raindrops, or the like have not adhered to the cut filter 9 or the lenses 331a and 332a of the cameras 331 and 332 will be described.

As illustrated in FIG. 20, an image captured by the camera unit 330 is output to the control unit 328 as a signal. Moreover, the control unit 328 performs processing of the signal received from the camera unit 330 and outputs this processed signal to the monitor 371. The monitor 371 projects an image captured by the main camera 331 based on a signal received from the control unit 328. A driver can check the circumstances on the side behind the side portion of the vehicle body 401 by visually recognizing an image projected in the monitor 371.

Here, each of the cameras 331 and 332, particularly the main camera 331 captures an image of the side behind the side portion of the vehicle body 401 via the cut filter 9. Accordingly, a predetermined wavelength range of light input to each of the cameras 331 and 332 from the outside is attenuated. Furthermore, the first light-shielding portion 342a which is a light-shielding portion of the protector 340 prevents an excessive quantity of light from being incident on the lens 331a. Therefore, for example, image capturing of the main camera 331 is prevented from becoming unclear, such as fogging in white at the time of backlighting.

Next, a case where a mark, raindrops, or the like have adhered to the cut filter 9 or the lenses 331a and 332a of the cameras 331 and 332 (which will hereinafter be referred to as a case when a mark has adhered) will be described.

Figure 21:
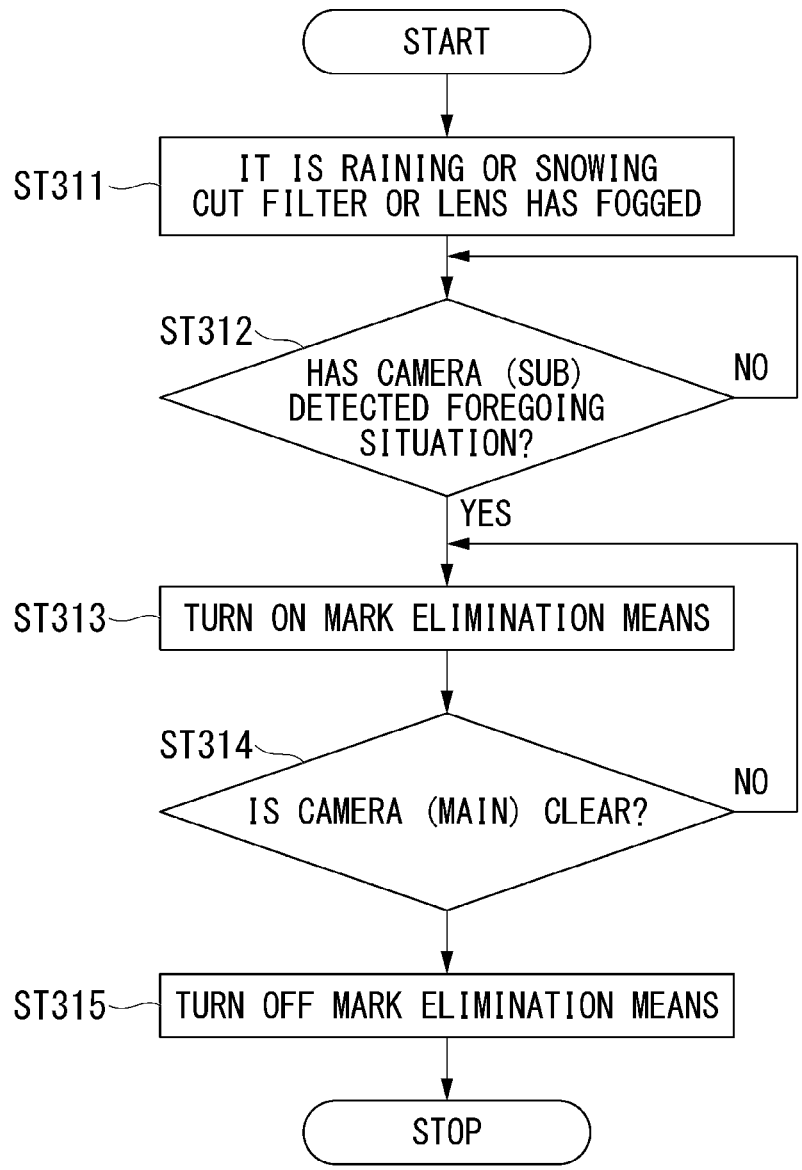
FIG. 21 is a flowchart of the door mirror system according to the third embodiment of the present invention when a mark has adhered.

FIG. 21 is a flowchart of the door mirror system 370 when a mark has adhered.

As illustrated in FIGS. 20 and 21, when dust or raindrops adhere to the cut filter 9 or when the cut filter 9 or the lens 332a of the sub-camera 332 fogs (Step ST311), the control unit 328 determines whether or not the foregoing situation is detected by the sub-camera 332 (Step ST312).

Here, since the main camera 331 is disposed under the same conditions as the sub-camera 332, the state of the lens 331a of the main camera 331 can be identified with the state of the lens 332a of the sub-camera 332. That is, determining whether or not the lens 331a of the main camera 331 has fogged is performed by determining whether or not the lens 332a of the sub-camera 332 has fogged.

When the determination in Step ST312 is "No", that is, when the sub-camera 332 does not detect that dust or raindrops have adhered to the cut filter 9, or the cut filter 930 or the lens 332a of the sub-camera 332 has fogged, the determination in Step ST312 is performed again.

On the other hand, when the determination in Step ST312 is "Yes", that is, when the sub-camera 332 detects that dust or raindrops have adhered to the cut filter 9, or the cut filter 9 or the lens 332a of the sub-camera 332 has fogged, the control unit 328 causes mark elimination means (not illustrated) to be driven (Step ST313).

Regarding the mark elimination means, for example, with respect to raindrops, snow, and fogging, a heater is provided inside the mirror housing 302, raindrops, snow, and fogging are eliminated by operating this heater. In addition, for example, with respect to dust and dirt, by providing a wiper device in the mirror housing 302, the surface 9b of the cut filter 9 is wiped by operating this wiper device.

Then, the control unit 328 determines whether or not an image captured by the main camera 331 is clear (Step ST314).

When the determination in Step ST314 is "No", that is, when the control unit 328 determines that an image captured by the main camera 331 is still unclear, the mark elimination device remains turned on. In addition, the determination in Step ST314 is performed again.

On the other hand, when the determination in Step ST314 is "Yes", that is, when the control unit 328 determines that an image captured by the main camera 331 has become clear, the mark elimination device is turned off and the processing of the door mirror system 370 is completed.

Next, based on FIGS. 20 and 22, a case when an obstacle is present on the side behind the side portion of the vehicle body 401 (which will hereinafter be referred to as a case when an obstacle is present) will be described.

Figure 22:
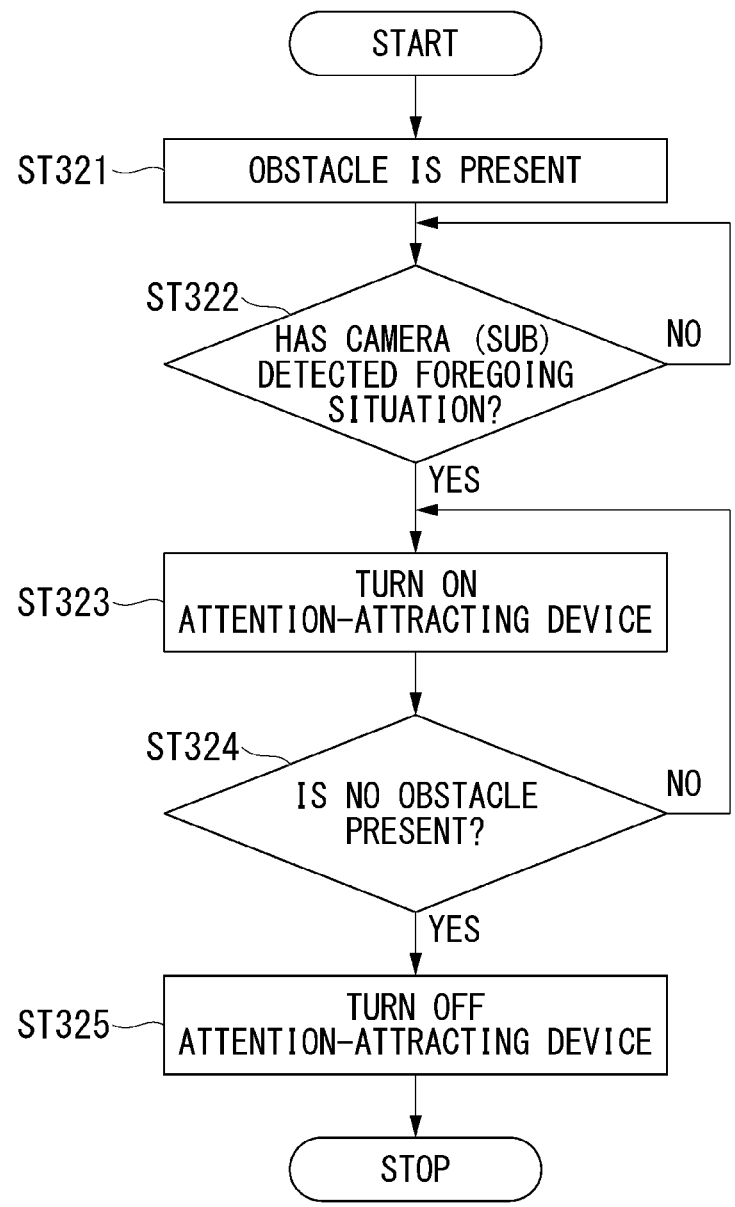
FIG. 22 is a flowchart of the door mirror system according to the third embodiment of the present invention when an obstacle is present.

FIG. 22 is a flowchart of the door mirror system 370 when an obstacle is present.

As illustrated in FIGS. 20 and 22, when an obstacle is present (Step ST321), the control unit 328 determines whether or not the foregoing situation is detected by the sub-camera 332 (Step ST322).

When the determination in Step ST322 is "No", that is, when no obstacle is present, the determination in Step ST322 is performed again.

On the other hand, when the determination in Step ST322 is "Yes", that is, when an obstacle is present, the control unit 28 causes an attention-attracting device (not illustrated) to be driven (Step ST323).

For example, the attention-attracting device may be an alarm unit which informs an occupant of danger by audio or may be a monitor which displays a video image from the sub-camera 332. The monitor may be the same as the monitor 371 which displays a video image from the main camera 331. When the monitor is the same as the monitor 371, it is desirable that the monitor project only video images from the main camera 331 during a normal time and an angle of view be changed when an obstacle is present, thereby displaying a video image of a wide angle of view which is a composite angle of view of the two cameras 331 and 332, such as the main camera 331 and the sub-camera 332.

Then, the control unit 328 determines whether or not the sub-camera 332 no longer detects an obstacle (Step ST324).

When the determination in Step ST324 is "No", that is, when it is determined that the sub-camera 332 still detects an obstacle, the attention-attracting device remains turned on. In addition, the determination in Step ST324 is performed again.

On the other hand, when the determination in Step ST324 is "Yes", that is, when it is determined that the sub-camera 332 no longer detects an obstacle, the attention-attracting device is turned off and the processing of the door mirror system 370 is completed.

When an obstacle is present on the side behind the side portion of the vehicle body 401, and when a mark, raindrops, or the like have adhered to the cut filter 9 or the lenses 331a and 332a of the cameras 331 and 332, a device to be driven preferentially between the mark elimination device and the attention-attracting device may be set arbitrarily.

In this manner, in the third embodiment described above, the camera unit 330 is accommodated inside the housing main body 304. The camera unit 330 is constituted of the two cameras 331 and 332, such as the main camera 331 and the sub-camera 332. Therefore, complicated control of the door mirror system 370 can be curbed by using both the cameras 331 and 332 in accordance with their purposes, such that the main camera 331 is utilized for capturing an image of the side behind the side portion of the vehicle body 401 and the sub-camera 332 is utilized as a sensor. In addition, the image-capturing ranges B1 and B2 can be changed easily by switching the cameras 331 and 332 to be used. Moreover, the main camera 331 can reliably and clearly capture an image of the side behind the vehicle body by wiping away an adhesive material or the like on the lenses 331a and 332a of the cameras 331 and 332 or the cut filter 9 based on detection results of the sub-camera 332.

In addition, the cut filter 9 is fitted into the opening portion 306a of the mirror housing 302 on the rear side. Therefore, the quantity of light incident on the camera unit 330 can be reduced by this cut filter 9. Thus, unclear image capturing at the time of backlighting or the like can be curbed even when the camera unit 330 is highly sensitive.

In addition, the mirror housing 302 is constituted of the support portion 303 which protrudes toward the right side from the vehicle body 401, and the housing main body 304 which is formed integrally with a tip of the support portion 303. Therefore, the number of components of the door mirror 301 can be reduced, and the manufacturing cost of the door mirror 301 can be decreased.

In addition, the door mirror 301 can have a neat appearance, and the designability of the door mirror 301 can be enhanced.

In the door mirror 301, the sub-camera 332 is disposed on the vehicle body 401 side of the mirror housing 302, and the main camera 331 is disposed on the right side that is a side opposite to the vehicle body 401 side of the mirror housing 302. Therefore, compared to the image-capturing range B1 of the main camera 331, the image-capturing range B2 of the sub-camera 332 is directed outward in the vehicle width direction, but the rim portion 306 is not projected in the sub-camera 332. As a result, the sub-camera 332 can capture an image with as large a range as possible to the side outward in the vehicle width direction.

In addition, since the image-capturing range B2 of the sub-camera 332 is directed outward in the vehicle width direction compared to the image-capturing range B1 of the main camera 331, an image with as large a range as possible to the side outward in the vehicle width direction can be captured by the sub-camera 332. Therefore, when the sub-camera 332 is used for detecting an obstacle, the accuracy of detecting an obstacle or the like can be enhanced.

In addition, the main camera 331 is disposed above the sub-camera 332. Then, the two cameras 331 and 332 are disposed to partially overlap each other when viewed in the height direction (up-down direction) of the vehicle body 401. Therefore, the length of the housing main body 304 in the vehicle width direction can be set to be short, so that an increase in vehicle width of the vehicle body 401 can be curbed.

Incidentally, when a harness to be connected to the camera unit 330, a storing device of the door mirror 301, and the like are accommodated inside the support portion 3 of the mirror housing 302, there is a need to expand the support portion 303 in the height direction of the vehicle body 401.

However, since the cameras 331 and 332 are disposed to partially overlap each other when viewed in the height direction of the vehicle body, the housing main body 304 can be formed to be large in the height direction, and the door mirror 301 in its entirety can be designed to have a smooth shape without unevenness. Therefore, the designability of the door mirror 301 can be enhanced.

In addition, since a filter film 312 of the cut filter 9 is constituted such that light can be reflected to the outside of the housing main body 304, the filter film 312 can be utilized as a mirror. Therefore, a driver can check the rear side of the vehicle body 401 utilizing the cut filter 9 by adjusting a tilting angle $\theta 2$ of the cut filter 9 (for example, the tilting angle $\theta 2$ is set within a range of 15° to 30°). Thus, even if a problem occurs in the camera unit 330, since the cut filter 9 is used as the door mirror 301, the side behind the vehicle body can be visually recognized, so that a fail-safe function of the door mirror 301 can be enhanced.

Furthermore, for example, if the sub-camera 332 used as a sensor is disposed on the vehicle body 401 side of the main camera 331, even when the housing main body 304 tilts to the vehicle body side, an image with as large a range as possible to the side outward in the vehicle width direction can be captured by the sub-camera 332 (refer to the image-capturing range B2 in FIG. 17). Accordingly, the function of the sub-camera 332 as a sensor is not impaired. Therefore, a tilt adjustment range of the housing main body 304 can be expanded as much as possible. Thus, the cut filter 9 can be utilized reliably as a mirror for checking the side behind the vehicle body.

In addition, the protector 340 is provided between the cut filter 9 and the camera unit 330 inside the mirror housing 302. The protector 340 has the main body portion 341 which is formed to have a plate shape such that the rear surface 9a of the cut filter 9 is covered, and the light-shielding portions 342a and 342b which are formed from this main body portion 341 to have a substantially cylindrical shape such that the surrounding area of the lenses 331a and 332a of the cameras 331 and 332 is covered. Therefore, each of the light-shielding portions 342a and 342b can more reliably prevent an excessive quantity of light from being incident on the lenses 331a and 332a of the cameras 331 and 332. In addition, the inside of the housing main body 4 can be made unlikely to be seen from the outside, and the designability of the door mirror 301 can be improved by forming the main body portion 341 of an opaque material or applying a paint thereto.

The present invention is not limited to the third embodiment described above and includes various modifications applied to the third embodiment described above within a range not departing from the gist of the present invention.

For example, in the third embodiment described above, a case where the camera unit 330 is constituted of the two cameras 331 and 332, such as the main camera 331 and the sub-camera 332 has been described. However, the embodiment is not limited thereto, and the camera unit 330 may be constituted of two or more, that is, a plurality of cameras. In this case, one camera may serve as the main camera 331, the remaining cameras may serve as the sub-cameras 332, and the sub-cameras 332 may be used as a sensor for detecting an adhered mark and as a sensor for detecting an obstacle in accordance with their purposes. In addition, two or more cameras may be constituted as the main cameras 331 such that the image-capturing range on the side behind the side portion of the vehicle body 401 is changed at the time of parking, for example.

In addition, a highly sensitive camera may be employed as the camera unit 330 to detect a following vehicle emitting a high beam or no light. A video image to be displayed in the monitor 371 may be processed such that a driver easily sees the image or attention of a driver is attracted.

In addition, in the third embodiment described above, a case where the tilting angle θ1 of the rim portion 306 of the mirror housing 302 is set within a range of 15° to 30° and the tilting angle θ2 of the cut filter 9 fitted into the opening portion 306a of the rim portion 306 is also set to an angle similar to the tilting angle θ1 has been described. However, the embodiment is not limited thereto, and each of the tilting angle θ1 of the rim portion 306 and the tilting angle θ2 of the cut filter 9 can be set to an arbitrary angle.

In addition, in the third embodiment described above, a case where the side turn lamp 380 is provided between the main body side base portion 361 and the main body side cover 362 from the front side surface to the right side surface in the housing main body 304 of the mirror housing 302 has been described. However, the embodiment is not limited thereto, and the side turn lamp 380 does not have to be provided.

INDUSTRIAL APPLICABILITY

According to the door mirror described above, only necessary places in a cut filter and a camera unit can be heated without heating the inside of a mirror housing in its entirety. Therefore, a field of view of the cut filter can be prevented from being reduced, and a lens of the camera unit can be prevented from fogging.

In addition, the quantity of light incident on the camera unit can be reduced by the cut filter. Therefore, unclear image capturing at the time of backlighting or the like can be curbed even when the camera unit is highly sensitive.

In addition, according to the door mirror described above, since two or more cameras are provided, an image-capturing range can be changed easily by switching the camera to be used. In addition, complicated control can be curbed by using a camera for capturing an image and a camera for detecting an obstacle or detecting a mark in accordance with a purpose.

Moreover, the quantity of light incident on the camera unit can be reduced by the cut filter. Therefore, unclear image capturing at the time of backlighting or the like can be curbed even when the camera unit is highly sensitive.

DESCRIPTION OF THE REFERENCE SYMBOLS 1, 301 Door mirror
2, 302 Mirror housing
5 Opening portion
6 Rim portion (frame body)
7 Fitting portion (circumferential edge)
8 Groove portion
9 Cut filter
9a Rear surface (surface on cut filter side)
9b Surface (one surface)
13 Hydrophilic film
17 Heater
30, 330 Camera unit
31 Main camera
31p, 32p Central axis
32 Sub-camera
40, 240 Door mirror system
101, 401 Vehicle body
230 Camera (camera unit)
303 Support portion
304 Housing main body
331 Main camera (first camera)
331a, 332a Lens
332 Sub-camera (second camera)
340 Protector
341 Main body portion
342a First light-shielding portion (light-shielding portion)
342b Second light-shielding portion (light-shielding portion)
B1, B2 Image-capturing range

The invention claimed is:

1. A door mirror, comprising:
a mirror housing that is provided in a side portion of a vehicle body;
a camera unit that is accommodated inside the mirror housing and captures an image of a rear side in a traveling direction of the vehicle body;
a cut filter that reduces a quantity of light incident on the camera unit; and
a heater that is provided on a surface of the cut filter on the camera unit side and is capable of heating the cut filter,
wherein the camera unit is disposed such that a central axis intersects a surface direction of the cut filter,
wherein the camera unit and the heater are disposed adjacent to each other,
wherein an opening portion is formed in the mirror housing toward the rear side in the traveling direction of the vehicle body,
wherein the mirror housing includes a frame body which is fitted into a circumferential edge of the opening portion of the mirror housing and into which the cut filter is fitted, and
wherein the opening portion is blocked by the cut filter and the frame body.

2. The door mirror according to claim 1, wherein a distance L between the camera unit and the heater is set to satisfy 1 mm≤L≤10 mm.

3. The door mirror according to claim 2, wherein the distance L is set to satisfy 2 mm≤L≤5 mm.

4. The door mirror according to claim 1, wherein the cut filter is constituted of at least one of a half mirror, an electrochromic filter, a polarizing plate, an ND filter, and a low reflection treatment glass.

5. The door mirror according to claim 1, wherein a surface of the cut filter on the rear side in the traveling direction of the vehicle body is subjected to a hydrophilic treatment.

6. The door mirror according to claim 1, wherein a surface of the cut filter on the rear side in the traveling direction of the vehicle body is subjected to a water repellent treatment.

7. The door mirror according to claim 1, wherein a groove portion is formed between the mirror housing and the frame body and over an entire circumference of the frame body.

8. The door mirror according to claim 1, wherein the camera unit has at least two cameras, which are
a first camera which captures an image of the rear side in the traveling direction including a part of the vehicle body, and
a second camera which captures an image of a range including a side further outward in a vehicle width direction of the vehicle body than an image-capturing range of the first camera.

9. The door mirror according to claim 8,
wherein the mirror housing includes
a support portion which is provided in the side portion of the vehicle body, and
a housing main body which is formed integrally with a tip of the support portion on a side opposite to the vehicle body.

10. The door mirror according to claim 8,
wherein the second camera performs image capturing to detect a material adhering to at least any one of a lens of the second camera and the cut filter.

11. The door mirror according to claim 8,
wherein the second camera is provided on the vehicle body side, and
wherein the first camera is provided on a side further outward in the vehicle width direction of the vehicle body than the second camera.

12. The door mirror according to claim 8,
wherein the first camera and the second camera are disposed to partially overlap each other when viewed in a height direction of the vehicle body.

13. The door mirror according to claim 8,
wherein one surface of the cut filter is worked to have a mirror shape, and the one surface is disposed toward the rear side in the traveling direction of the vehicle body.

14. The door mirror according to claim 8,
wherein a protector is provided between the cut filter and the camera unit, and
wherein the protector has
a plate-shaped main body portion, and
a tubular light-shielding portion which projects from the main body portion and covers a surrounding area of each of the lenses of the first camera and the second camera.

* * * * *